US012272485B2

(12) United States Patent
Hirukawa et al.

(10) Patent No.: US 12,272,485 B2
(45) Date of Patent: Apr. 8, 2025

(54) MULTILAYER COIL COMPONENT

(71) Applicant: Murata Manufacturing Co., Ltd., Kyoto-fu (JP)

(72) Inventors: Atsuo Hirukawa, Nagaokakyo (JP); Suradech Nohchai, Nagaokakyo (JP); Shun Takai, Nagaokakyo (JP); Kenjirou Koshiji, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 705 days.

(21) Appl. No.: 17/673,189

(22) Filed: Feb. 16, 2022

(65) Prior Publication Data

US 2022/0270808 A1 Aug. 25, 2022

(30) Foreign Application Priority Data

Feb. 17, 2021 (JP) ................................ 2021-023405

(51) Int. Cl.

| | |
|---|---|
| ***H01F 5/00*** | (2006.01) |
| ***H01F 1/34*** | (2006.01) |
| ***H01F 27/28*** | (2006.01) |
| ***H01F 27/29*** | (2006.01) |
| ***H01F 27/32*** | (2006.01) |

(52) U.S. Cl.

CPC ......... *H01F 27/2804* (2013.01); *H01F 1/342* (2013.01); *H01F 27/29* (2013.01); *H01F 27/323* (2013.01); *H01F 2027/2809* (2013.01)

(58) Field of Classification Search

CPC .................................................. H01F 27/2804

USPC .......................................................... 336/200

See application file for complete search history.

(56) References Cited

U.S. PATENT DOCUMENTS

| | | | | |
|---|---|---|---|---|
| 6,218,925 B1 * | 4/2001 | Iwao | H01F 27/292 | 336/200 |
| 6,580,350 B1 * | 6/2003 | Kobayashi | H01F 17/0013 | 336/200 |
| 7,375,977 B2 * | 5/2008 | Maeda | H01F 17/0013 | 336/200 |

(Continued)

FOREIGN PATENT DOCUMENTS

| | | |
|---|---|---|
| CN | 111048296 A | 4/2020 |
| JP | 2014-212298 A | 11/2014 |

(Continued)

*Primary Examiner* — Ronald Hinson

(74) *Attorney, Agent, or Firm* — Studebaker Brackett PLLC

(57) ABSTRACT

A multilayer coil component includes a body formed by multiple insulating layers stacked in a direction of stacking and having first and second end surfaces opposite each other in a length direction, first and second main surfaces opposite each other in a height direction, perpendicular to the length direction, and first and second lateral surfaces opposite each other in a width direction, perpendicular to the length direction and to the height direction; a coil inside the body and including multiple coil conductors electrically coupled together; and a first outer electrode extending from at least part of the first end surface of the body to part of the first main surface and electrically coupled to the coil. The direction of stacking of the insulating layers and the direction of the coil axis of the coil are parallel with the first main surface, which is the mounting surface, of the body.

20 Claims, 8 Drawing Sheets

(56) References Cited

U.S. PATENT DOCUMENTS

| | | | | |
|---|---|---|---|---|
| 8,159,322 | B2 * | 4/2012 | Iwasaki | H01F 17/0013 336/200 |
| 9,412,509 | B2 * | 8/2016 | Im | H01F 27/292 |
| 11,810,704 | B2 * | 11/2023 | Sato | H01F 17/0013 |
| 2012/0188682 | A1 * | 7/2012 | Sato | H01G 4/232 336/200 |
| 2016/0314891 | A1 * | 10/2016 | Onozaki | H01F 41/041 |
| 2016/0351321 | A1 * | 12/2016 | Lyoo | H01F 41/041 |
| 2017/0133146 | A1 * | 5/2017 | Lee | H01F 41/042 |
| 2017/0345552 | A1 * | 11/2017 | Nakano | H01F 41/043 |
| 2019/0148060 | A1 * | 5/2019 | Arai | H01F 27/2804 336/192 |
| 2019/0198232 | A1 * | 6/2019 | Sato | H01F 27/2804 |

FOREIGN PATENT DOCUMENTS

| | | | |
|---|---|---|---|
| JP | 2018-170429 | A | 11/2018 |
| JP | 2019-186255 | A | 10/2019 |
| JP | 2020-61522 | A | 4/2020 |

* cited by examiner

MULTILAYER COIL COMPONENT

CROSS-REFERENCE TO RELATED APPLICATION

This application claims benefit of priority to Japanese Patent Application No. 2021-023405, filed Feb. 17, 2021, the entire content of which is incorporated herein by reference.

BACKGROUND

Technical Field

The present disclosure relates to a multilayer coil component.

Background Art

As a multilayer coil component superior in radiofrequency characteristics, Japanese Unexamined Patent Application Publication No. 2019-186255 discloses a multilayer coil component having a transmission coefficient S21 at 40 GHz of −1.0 dB or more and 0 dB or less.

SUMMARY

As high-speed and large-capacity communication has advanced, however, multilayer coil components are now expected to have a high transmission coefficient S21 over higher-frequency bands and be consistent in the transmission coefficient S21 in the radiofrequency and lower-frequency bands at the same time.

Accordingly, the present disclosure provides a multilayer coil component that has a high and consistent transmission coefficient S21 in the radiofrequency band.

In its first aspect, the multilayer coil component according to the present disclosure includes a body formed by a plurality of insulating layers stacked in a direction of stacking and having first and second end surfaces opposite each other in a length direction, first and second main surfaces opposite each other in a height direction, perpendicular to the length direction, and first and second lateral surfaces opposite each other in a width direction, perpendicular to the length direction and to the height direction. The multilayer coil component further includes a coil disposed inside the body and formed by a plurality of coil conductors electrically coupled together; and a first outer electrode extending from at least part of the first end surface of the body to part of the first main surface and electrically coupled to the coil. The direction of stacking of the insulating layers and a direction of a coil axis of the coil are parallel with the first main surface, which is a mounting surface, of the body. The first outer electrode has, in order from a body side, an underlying electrode and a plating electrode on the underlying electrode. When a boundary is defined that extends parallel with the height and width directions at a midpoint of the body in the length direction, the body has first and second body sections aligned in the length direction with the boundary therebetween, with the first body section including the first end surface and the second body section including the second end surface. When a first reference position is defined that coincides in the height direction with an end in the length direction of a portion of the underlying electrode lying on the first main surface of the body, the first body section has first and second regions, with the first region including at least a range having a dimension in the length direction of 20 μm from the first reference position toward the second end surface and a second region being all but the first region. In the first region, a percentage by volume of a nonmagnetic phase to a total volume of magnetic phase and nonmagnetic phase is 60% by volume or more. In the second region, a percentage by volume of a nonmagnetic phase to a total volume of magnetic phase and nonmagnetic phase is 50% by volume or less.

In its second aspect, the multilayer coil component according to the present disclosure includes a body formed by a plurality of insulating layers stacked in a direction of stacking and having first and second end surfaces opposite each other in a length direction, first and second main surfaces opposite each other in a height direction, perpendicular to the length direction, and first and second lateral surfaces opposite each other in a width direction, perpendicular to the length direction and to the height direction; a coil disposed inside the body and formed by a plurality of coil conductors electrically coupled together. The multilayer coil component further includes a first outer electrode extending from at least part of the first end surface of the body to part of the first main surface and electrically coupled to the coil, wherein the direction of stacking of the insulating layers and a direction of a coil axis of the coil are parallel with the first main surface, which is a mounting surface, of the body. The first outer electrode has, in order from a body side, an underlying electrode and a plating electrode on the underlying electrode. When a boundary is defined that extends parallel with the height and width directions at a midpoint of the body in the length direction, the body has first and second body sections aligned in the length direction with the boundary therebetween, with the first body section including the first end surface and the second body section including the second end surface. When a first reference position is defined that coincides in the height direction with an end in the length direction of a portion of the underlying electrode lying on the first main surface of the body, the first body section has first and second regions, with the first region including at least a range having a dimension in the length direction of 20 μm from the first reference position toward the second end surface and the second region being all but the first region. The first region contains, in a total of 100% by weight, 30.0% by weight or more and 85.0% by weight or less (i.e., from 30.0% by weight to 85.0% by weight) Si in terms of a $SiO_2$ basis, 4.0% by weight or more and 15.0% by weight or less (i.e., from 4.0% by weight to 15.0% by weight) B in terms of a B2O3 basis, 0% by weight or more and 45.0% by weight or less (i.e., from 0% by weight to 45.0% by weight) Fe in terms of an Fe2O3 basis, 0% by weight or more and 15.0% by weight (i.e., from 0% by weight to 15.0% by weight) Ni in terms of a NiO basis, 0% by weight or more and 8.0% by weight or less (i.e., from 0% by weight to 8.0% by weight) Zn in terms of a ZnO basis, and 0% by weight or more and 5.0% by weight or less (i.e., from 0% by weight to 5.0% by weight) Cu in terms of a CuO basis. The second region contains, in a total of 100% by weight, 0% by weight or more and 25.0% by weight or less (i.e., from 0% by weight to 25.0% by weight) Si in terms of a $SiO_2$ basis, 0% by weight or more and 5.0% by weight or less (i.e., from 0% by weight to 5.0% by weight) B in terms of a B2O3 basis, 45.0% by weight or more and 70.0% by weight or less (i.e., from 45.0% by weight to 70.0% by weight) Fe in terms of an Fe2O3 basis, 10.0% by weight or more and 20.0% by weight or less (i.e., from 10.0% by weight to 20.0% by weight) Ni in terms of a NiO basis, and 5.0% by weight or more and 12.0% by weight or less (i.e., from 5.0% by weight to 12.0% by weight) Zn in terms of a ZnO basis.

According to the present disclosure, there can be provided a multilayer coil component that has a high and consistent transmission coefficient S21 in the radiofrequency band.

DETAILED DESCRIPTION

The following describes the multilayer coil component according to the present disclosure. It should be noted that the present disclosure is not limited to the following configurations and may optionally be modified within the scope of the present disclosure. Combinations of multiple ones of the specific preferred configurations set forth below are also the present disclosure.

In its first and second aspects, the multilayer coil component according to the present disclosure includes a body formed by multiple insulating layers stacked in a direction of stacking and having first and second end surfaces opposite each other in a length direction, first and second main surfaces opposite each other in a height direction, perpendicular to the length direction, and first and second lateral surfaces opposite each other in a width direction, perpendicular to the length direction and to the height direction. The multilayer coil component further includes a coil disposed inside the body and formed by multiple coil conductors electrically coupled together; and a first outer electrode extending from at least part of the first end surface of the body to part of the first main surface and electrically coupled to the coil.

When what is stated applies to both the first and second aspects of the multilayer coil component according to the present disclosure herein, the simple term "multilayer coil component according to the present disclosure" is used.

Figure 1:
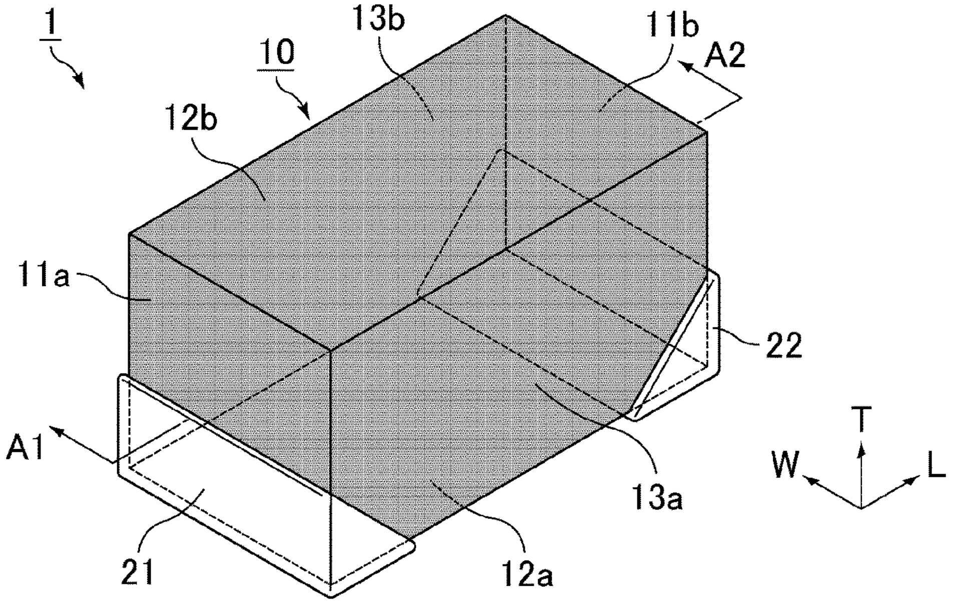
FIG. 1 is a perspective schematic diagram illustrating an example of a multilayer coil component according to the present disclosure.

FIG. 1 is a perspective schematic diagram illustrating an example of a multilayer coil component according to the present disclosure.

As illustrated in FIG. 1, the multilayer coil component 1 has a body 10, a first outer electrode 21, and a second outer electrode 22. Although not illustrated in FIG. 1, the multilayer coil component 1 also has, as described later herein, a coil disposed inside the body 10.

As illustrated, for example in FIG. 1, length, height, and width directions are herein defined as the directions denoted by L, T, and W, respectively. The length direction L, the height direction T, and the width direction W are perpendicular to one another.

The body 10 has a first end surface 11*a* and a second end surface 11*b* opposite each other in the length direction L, a first main surface 12*a* and a second main surface 12*b* opposite each other in the height direction T, and a first lateral surface 13*a* and a second lateral surface 13*b* opposite each other in the width direction W and is, for example, cuboid or substantially cuboid in shape.

The first and second end surfaces 11*a* and 11*b* of the body 10 do not need to be strictly perpendicular to the length direction L. The first and second main surfaces 12*a* and 12*b* of the body 10 do not need to be strictly perpendicular to the height direction T either. The first and second lateral surfaces 13*a* and 13*b* of the body 10, furthermore, do not need to be strictly perpendicular to the width direction W.

When the multilayer coil component 1 is mounted onto a substrate, the first main surface 12*a* of the body 10 is the mounting surface.

Preferably, the body 10 has rounded corners and edges. A corner of the body 10 is a point of the body 10 at which three of its faces meet. An edge of the body 10 is a portion of the body 10 at which two of its faces meet.

Figure 2:
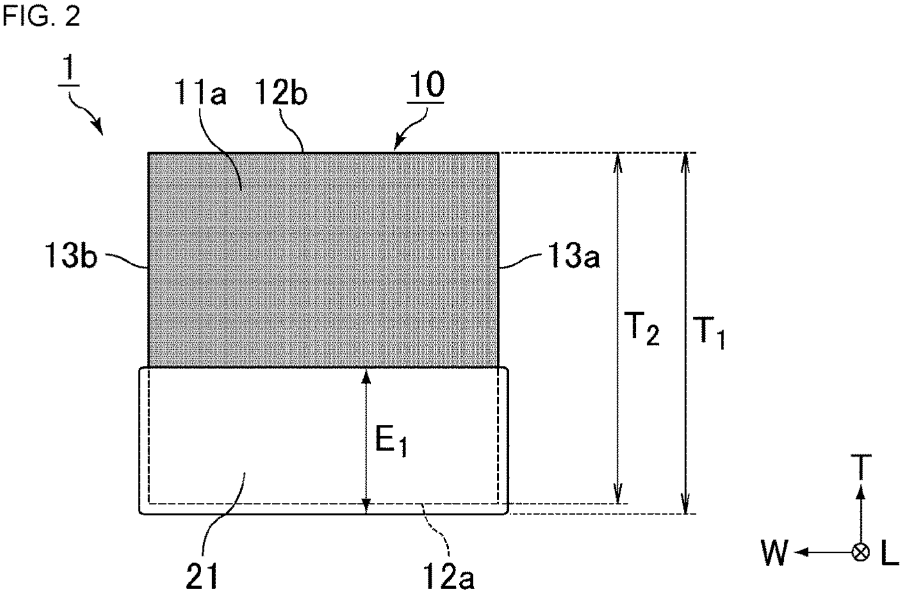
FIG. 2 is a plan schematic diagram illustrating the multilayer coil component in FIG. 1 when viewed from the first end surface side of the body.
Figure 3:
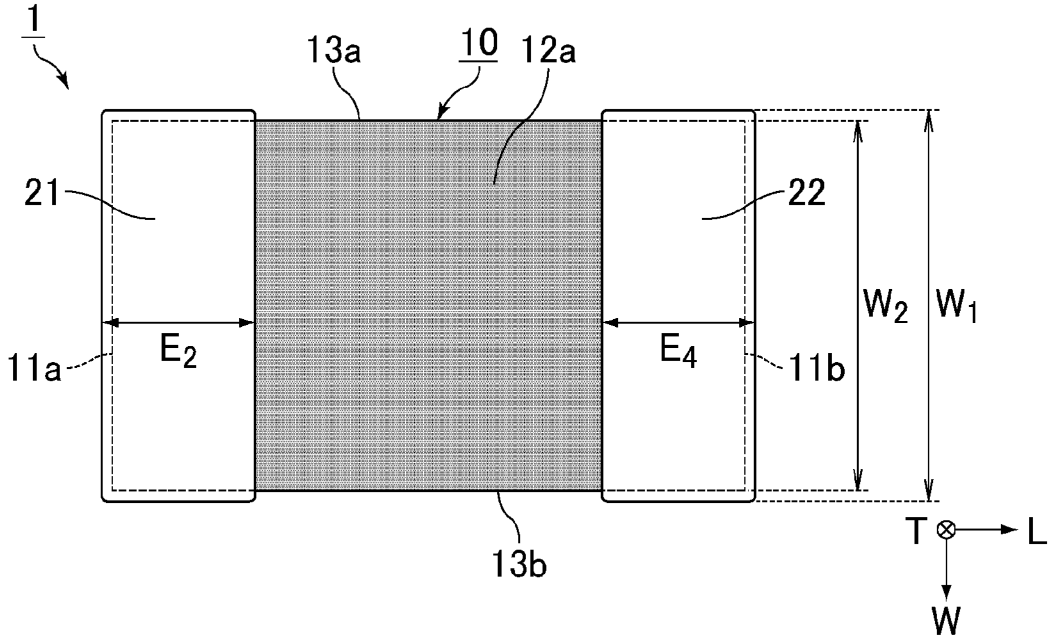
FIG. 3 is a plan schematic diagram illustrating the multilayer coil component in FIG. 1 when viewed from the first main surface side of the body.
Figure 4:
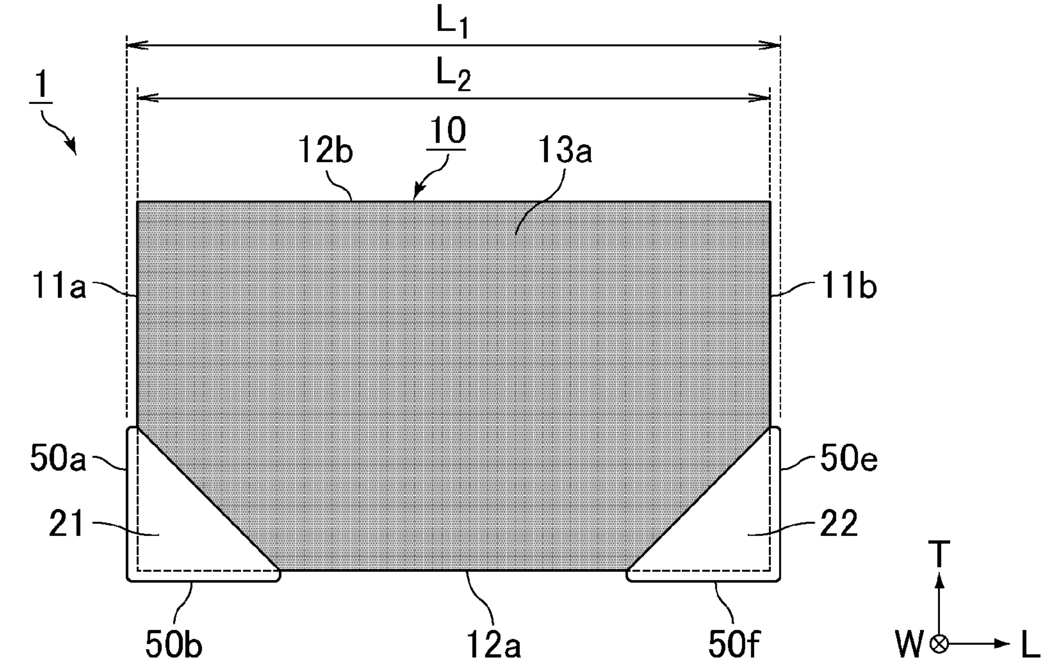
FIG. 4 is a plan schematic diagram illustrating the multilayer coil component in FIG. 1 when viewed from the first lateral surface side of the body.
Figure 5:
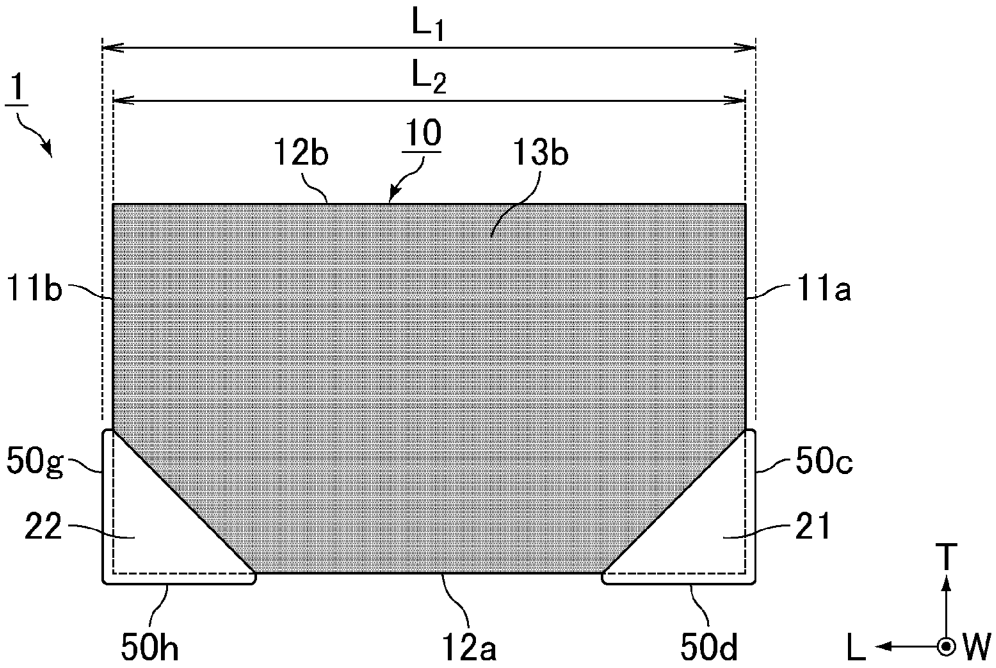
FIG. 5 is a plan schematic diagram illustrating the multilayer coil component in FIG. 1 when viewed from the second lateral surface side of the body.
Figure 6:
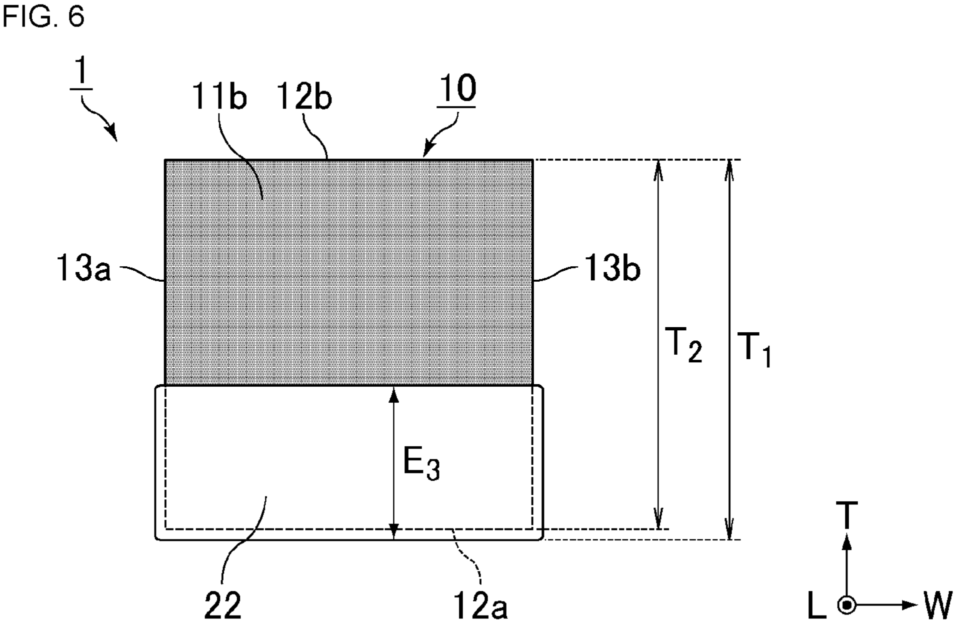
FIG. 6 is a plan schematic diagram illustrating the multilayer coil component in FIG. 1 when viewed from the second end surface side of the body.

FIG. 2 is a plan schematic diagram illustrating the multilayer coil component in FIG. 1 when viewed from the first end surface side of the body. FIG. 3 is a plan schematic diagram illustrating the multilayer coil component in FIG. 1 when viewed from the first main surface side of the body. FIG. 4 is a plan schematic diagram illustrating the multilayer coil component in FIG. 1 when viewed from the first lateral surface side of the body. FIG. 5 is a plan schematic diagram illustrating the multilayer coil component in FIG. 1 when viewed from the second lateral surface side of the body. FIG. 6 is a plan schematic diagram illustrating the multilayer coil component in FIG. 1 when viewed from the second end surface side of the body.

As illustrated in FIGS. 1, 2, and 3, the first outer electrode 21 extends from at least part of the first end surface 11*a* of the body 10, from part of the first end surface 11*a* of the body 10 here, to part of the first main surface 12*a*. The presence of the first outer electrode 21 on the first main surface 12*a*, which is the mounting surface, of the body 10, improves the ease of mounting of the multilayer coil component 1.

As illustrated in FIG. 2, the first outer electrode 21 covers a region of the first end surface 11*a* of the body 10 including the edge at which it meets the first main surface 12*a* and does not cover a region including the edge at which it meets the second main surface 12*b*. This makes the first end surface 11*a* of the body 10 exposed in its region including the edge at which it meets the second main surface 12*b*.

When the first outer electrode 21 is viewed in the length direction L, its dimension $E_1$ in the height direction T does not need to be constant in the width direction W, although it is constant in FIG. 2. For example, when viewed in the length direction L, the first outer electrode 21 may have an arched shape, in which the dimension $E_1$ in the height direction T increases from the ends toward the middle in the width direction W.

The first outer electrode 21 may be on part of the first end surface 11*a* of the body 10 as illustrated in FIGS. 1 and 2 or may be over the entire first end surface 11*a* of the body 10.

As illustrated in FIG. 3, the first outer electrode 21 covers a region of the first main surface 12*a* of the body 10 including the edge at which it meets the first end surface 11*a* and does not cover a region including the edge at which it meets the second end surface 11*b*.

When the first outer electrode 21 is viewed in the height direction T, its dimension $E_2$ in the length direction L does not need to be constant in the width direction W, although it is constant in FIG. 3. For example, when viewed in the height direction T, the first outer electrode 21 may have an arched shape, in which the dimension $E_2$ in the length direction L increases from the ends toward the middle in the width direction W.

As illustrated in FIGS. 1, 4, and 5, the first outer electrode 21 may extend from part of the first end surface 11*a* of the body 10 to part of the first main surface 12*a* and also to part of the first lateral surface 13*a* and part of the second lateral surface 13*b*. More specifically, the first outer electrode 21 may cover a region of the first lateral surface 13*a* of the body 10 including the vertex at which it meets the first end surface 11*a* and the first main surface 12*a* without covering a region including the vertex at which it meets the first end surface 11*a* and the second main surface 12*b*. The first outer electrode 21, furthermore, may cover a region of the second lateral surface 13*b* of the body 10 including the vertex at which it meets the first end surface 11*a* and the first main surface 12*a* without covering a region including the vertex at which it meets the first end surface 11*a* and the second main surface 12*b*.

Preferably, as illustrated in FIG. 4, the contours of the portion of the first outer electrode 21 covering the first lateral surface 13*a* of the body 10 include a first contour 50*a* facing the edge at which the first lateral surface 13*a* and the first end surface 11*a* meet, a second contour 50*b* facing the edge at which the first lateral surface 13*a* and the first main surface 12*a* meet, and a contour diagonal to the first and second contours 50*a* and 50*b* in addition to these.

Preferably, as illustrated in FIG. 5, the contours of the portion of the first outer electrode 21 covering the second lateral surface 13*b* of the body 10 include a third contour 50*c* facing the edge at which the second lateral surface 13*b* and the first end surface 11*a* meet, a fourth contour 50*d* facing the edge at which the second lateral surface 13*b* and the first main surface 12*a* meet, and a contour diagonal to the third and fourth contours 50*c* and 50*d* in addition to these.

The first outer electrode 21 may be off the first lateral surface 13*a* of the body 10. The first outer electrode 21, furthermore, may be off the second lateral surface 13*b* of the body 10.

The first outer electrode 21 may extend from the first end surface 11*a* of the body 10 to part of each of the first main surface 12*a*, second main surface 12*b*, first lateral surface 13*a*, and second lateral surface 13*b*.

As illustrated in FIGS. 1, 3, and 6, the second outer electrode 22 extends from at least part of the second end surface 11*b* of the body 10, from part of the second end surface 11*b* of the body 10 here, to part of the first main surface 12*a*. The presence of the second outer electrode 22 on the first main surface 12*a*, which is the mounting surface, of the body 10, improves the ease of mounting of the multilayer coil component 1.

As illustrated in FIG. 6, the second outer electrode 22 covers a region of the second end surface 11*b* of the body 10 including the edge at which it meets the first main surface 12*a* and does not cover a region including the edge at which it meets the second main surface 12*b*. This makes the second end surface 11*b* of the body 10 exposed in its region including the edge at which it meets the second main surface 12*b*.

When the second outer electrode 22 is viewed in the length direction L, its dimension $E_3$ in the height direction T does not need to be constant in the width direction W, although it is constant in FIG. 6. For example, when viewed in the length direction L, the second outer electrode 22 may have an arched shape, in which the dimension $E_3$ in the height direction T increases from the ends toward the middle in the width direction W.

The second outer electrode 22 may be on part of the second end surface 11*b* of the body 10 as illustrated in FIGS. 1 and 6 or may be over the entire second end surface 11*b* of the body 10.

As illustrated in FIG. 3, the second outer electrode 22 covers a region of the first main surface 12*a* of the body 10 including the edge at which it meets the second end surface 11*b* and does not cover a region including the edge at which it meets the first end surface 11*a*.

When the second outer electrode 22 is viewed in the height direction T, its dimension $E_4$ in the length direction L does not need to be constant in the width direction W, although it is constant in FIG. 3. For example, when viewed in the height direction T, the second outer electrode 22 may have an arched shape, in which the dimension $E_4$ in the length direction L increases from the ends toward the middle in the width direction W.

As illustrated in FIGS. 1, 4, and 5, the second outer electrode 22 may extend from part of the second end surface 11*b* of the body 10 to part of the first main surface 12*a* and also to part of the first lateral surface 13*a* and part of the second lateral surface 13*b*. More specifically, the second outer electrode 22 may cover a region of the first lateral surface 13*a* of the body 10 including the vertex at which it meets the second end surface 11*b* and the first main surface 12*a* without covering a region including the vertex at which it meets the second end surface 11*b* and the second main surface 12*b*. The second outer electrode 22, furthermore, may cover a region of the second lateral surface 13*b* of the body 10 including the vertex at which it meets the second end surface 11*b* and the first main surface 12*a* without covering a region including the vertex at which it meets the second end surface 11*b* and the second main surface 12*b*.

Preferably, as illustrated in FIG. 4, the contours of the portion of the second outer electrode 22 covering the first lateral surface 13*a* of the body 10 include a fifth contour 50*e* facing the edge at which the first lateral surface 13*a* and the second end surface 11*b* meet, a sixth contour 50*f* facing the edge at which the first lateral surface 13*a* and the first main surface 12*a* meet, and a contour diagonal to the fifth and sixth contours 50*e* and 50*f* in addition to these.

Preferably, as illustrated in FIG. 5, the contours of the portion of the second outer electrode 22 covering the second lateral surface 13*b* of the body 10 include a seventh contour 50*g* facing the edge at which the second lateral surface 13*b* and the second end surface 11*b* meet, an eighth contour 50*h* facing the edge at which the second lateral surface 13*b* and the first main surface 12*a* meet, and a contour diagonal to the seventh and eighth contours 50*g* and 50*h* in addition to these.

The second outer electrode 22 may be off the first lateral surface 13*a* of the body 10. The second outer electrode 22, furthermore, may be off the second lateral surface 13*b* of the body 10.

The second outer electrode 22 may extend from the second end surface 11*b* of the body 10 to part of each of the first main surface 12*a*, second main surface 12*b*, first lateral surface 13*a*, and second lateral surface 13*b*.

The size of the multilayer coil component 1 is not critical, but preferably is the 0603, 0402, or 1005 size.

For when the multilayer coil component 1 is the 0603, 0402, or 1005 size, the following presents specific examples of preferred dimensions of the multilayer coil component 1, body 10, first outer electrode 21, and second outer electrode 22.

(1) When the multilayer coil component 1 is the 0603 size

Preferably, the dimension $L_1$ of the multilayer coil component 1 in the length direction L is 0.57 mm or more. Preferably, furthermore, the dimension $L_1$ of the multilayer coil component 1 in the length direction L is 0.63 mm or less.

Preferably, the dimension $T_1$ of the multilayer coil component 1 in the height direction T is 0.27 mm or more. Preferably, furthermore, the dimension $T_1$ of the multilayer coil component 1 in the height direction T is 0.33 mm or less.

Preferably, the dimension $W_1$ of the multilayer coil component 1 in the width direction W is 0.27 mm or more. Preferably, furthermore, the dimension $W_1$ of the multilayer coil component 1 in the width direction W is 0.33 mm or less.

Preferably, the dimension $L_2$ of the body 10 in the length direction L is 0.57 mm or more. Preferably, furthermore, the dimension $L_2$ of the body 10 in the length direction L is 0.63 mm or less.

Preferably, the dimension $T_2$ of the body 10 in the height direction T is 0.27 mm or more. Preferably, furthermore, the dimension $T_2$ of the body 10 in the height direction T is 0.33 mm or less.

Preferably, the dimension $W_2$ of the body 10 in the width direction W is 0.27 mm or more. Preferably, furthermore, the dimension $W_2$ of the body 10 in the width direction W is 0.33 mm or less.

Preferably, the dimension $E_1$ of the first outer electrode 21 in the height direction T is 0.10 mm or more and 0.20 mm or less (i.e., from 0.10 mm to 0.20 mm). If the dimension $E_1$ of the first outer electrode 21 in the height direction T is not constant in the width direction W, it is preferred that the maximum be in this range.

Preferably, the dimension $E_2$ of the first outer electrode 21 in the length direction L is 0.12 mm or more and 0.22 mm or less (i.e., from 0.12 mm to 0.22 mm). If the dimension $E_2$ of the first outer electrode 21 in the length direction L is not constant in the width direction W, it is preferred that the maximum be in this range.

Preferably, the dimension $E_3$ of the second outer electrode 22 in the height direction T is 0.10 mm or more and 0.20 mm or less (i.e., from 0.10 mm to 0.20 mm). If the dimension $E_3$ of the second outer electrode 22 in the height direction T is not constant in the width direction W, it is preferred that the maximum be in this range.

Preferably, the dimension $E_4$ of the second outer electrode 22 in the length direction L is 0.12 mm or more and 0.22 mm or less (i.e., from 0.12 mm to 0.22 mm). If the dimension $E_4$ of the second outer electrode 22 in the length direction L is not constant in the width direction W, it is preferred that the maximum be in this range.

(2) When the multilayer coil component 1 is the 0402 size

Preferably, the dimension $L_1$ of the multilayer coil component 1 in the length direction L is 0.38 mm or more. Preferably, furthermore, the dimension $L_1$ of the multilayer coil component 1 in the length direction L is 0.42 mm or less.

Preferably, the dimension $T_1$ of the multilayer coil component 1 in the height direction T is 0.18 mm or more. Preferably, furthermore, the dimension $T_1$ of the multilayer coil component 1 in the height direction T is 0.22 mm or less.

Preferably, the dimension $W_1$ of the multilayer coil component 1 in the width direction W is 0.18 mm or more. Preferably, furthermore, the dimension $W_1$ of the multilayer coil component 1 in the width direction W is 0.22 mm or less.

Preferably, the dimension $L_2$ of the body 10 in the length direction L is 0.38 mm or more. Preferably, furthermore, the dimension $L_2$ of the body 10 in the length direction L is 0.42 mm or less.

Preferably, the dimension $T_2$ of the body 10 in the height direction T is 0.18 mm or more. Preferably, furthermore, the dimension $T_2$ of the body 10 in the height direction T is 0.22 mm or less.

Preferably, the dimension $W_2$ of the body 10 in the width direction W is 0.18 mm or more. Preferably, furthermore, the dimension $W_2$ of the body 10 in the width direction W is 0.22 mm or less.

Preferably, the dimension $E_1$ of the first outer electrode 21 in the height direction T is 0.06 mm or more and 0.13 mm or less (i.e., from 0.06 mm to 0.13 mm). If the dimension $E_1$ of the first outer electrode 21 in the height direction T is not constant in the width direction W, it is preferred that the maximum be in this range.

Preferably, the dimension $E_2$ of the first outer electrode 21 in the length direction L is 0.08 mm or more and 0.15 mm or less (i.e., from 0.08 mm to 0.15 mm). If the dimension $E_2$ of the first outer electrode 21 in the length direction L is not constant in the width direction W, it is preferred that the maximum be in this range.

Preferably, the dimension $E_3$ of the second outer electrode 22 in the height direction T is 0.06 mm or more and 0.13 mm or less (i.e., from 0.06 mm to 0.13 mm). If the dimension $E_3$ of the second outer electrode 22 in the height direction T is not constant in the width direction W, it is preferred that the maximum be in this range.

Preferably, the dimension $E_4$ of the second outer electrode 22 in the length direction L is 0.08 mm or more and 0.15 mm or less (i.e., from 0.08 mm to 0.15 mm). If the dimension $E_4$ of the second outer electrode 22 in the length direction L is not constant in the width direction W, it is preferred that the maximum be in this range.

(3) When the multilayer coil component 1 is the 1005 size

Preferably, the dimension $L_1$ of the multilayer coil component 1 in the length direction L is 0.95 mm or more. Preferably, furthermore, the dimension $L_1$ of the multilayer coil component 1 in the length direction L is 1.05 mm or less.

Preferably, the dimension $T_1$ of the multilayer coil component 1 in the height direction T is 0.45 mm or more. Preferably, furthermore, the dimension $T_1$ of the multilayer coil component 1 in the height direction T is 0.55 mm or less.

Preferably, the dimension $W_1$ of the multilayer coil component 1 in the width direction W is 0.45 mm or more. Preferably, furthermore, the dimension $W_1$ of the multilayer coil component 1 in the width direction W is 0.55 mm or less.

Preferably, the dimension $L_2$ of the body 10 in the length direction L is 0.95 mm or more. Preferably, furthermore, the dimension $L_2$ of the body 10 in the length direction L is 1.05 mm or less.

Preferably, the dimension $T_2$ of the body 10 in the height direction T is 0.45 mm or more. Preferably, furthermore, the dimension $T_2$ of the body 10 in the height direction T is 0.55 mm or less.

Preferably, the dimension $W_2$ of the body 10 in the width direction W is 0.45 mm or more. Preferably, furthermore, the dimension $W_2$ of the body 10 in the width direction W is 0.55 mm or less.

Preferably, the dimension $E_1$ of the first outer electrode 21 in the height direction T is 0.15 mm or more and 0.33 mm or less (i.e., from 0.15 mm to 0.33 mm). If the dimension $E_1$ of the first outer electrode 21 in the height direction T is not constant in the width direction W, it is preferred that the maximum be in this range.

Preferably, the dimension $E_2$ of the first outer electrode 21 in the length direction L is 0.20 mm or more and 0.38 mm or less (i.e., from 0.20 mm to 0.38 mm). If the dimension $E_2$ of the first outer electrode 21 in the length direction L is not constant in the width direction W, it is preferred that the maximum be in this range.

Preferably, the dimension $E_3$ of the second outer electrode 22 in the height direction T is 0.15 mm or more and 0.33 mm or less (i.e., from 0.15 mm to 0.33 mm). If the dimension $E_3$ of the second outer electrode 22 in the height direction T is not constant in the width direction W, it is preferred that the maximum be in this range.

Preferably, the dimension $E_4$ of the second outer electrode 22 in the length direction L is 0.20 mm or more and 0.38 mm or less (i.e., from 0.20 mm to 0.38 mm). If the dimension $E_4$ of the second outer electrode 22 in the length direction L is not constant in the width direction W, it is preferred that the maximum be in this range.

In the first and second aspects of the multilayer coil component according to the present disclosure, the direction of stacking of the insulating layers and the direction of the coil axis of the coil are parallel with the first main surface, which is the mounting surface, of the body.

Figure 7:
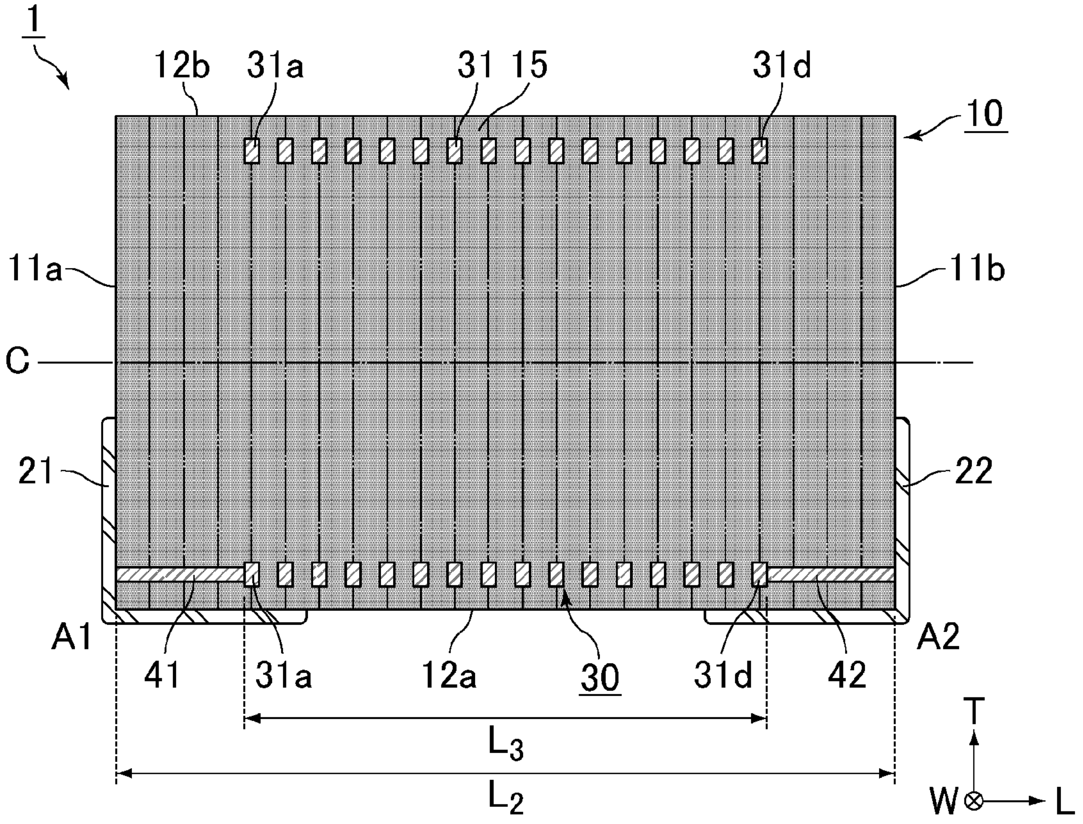
FIG. 7 is a cross-sectional schematic diagram illustrating an example of a portion corresponding to line segment A1-A2 in FIG. 1.

FIG. 7 is a cross-sectional schematic diagram illustrating an example of a portion corresponding to line segment A1-A2 in FIG. 1.

As illustrated in FIG. 7, the body 10 is formed by multiple insulating layers 15 stacked in a direction of stacking, in the length direction L here. That is, the direction of stacking of the insulating layers 15 is parallel with the length direction L and parallel with the first main surface 12*a*, which is the mounting surface, of the body 10. It should be noted that in FIG. 7, the insulating layers 15 are illustrated with lines therebetween for the convenience of description, but in actuality, no clear lines would be seen.

Inside the body 10 is a coil 30. The coil 30 is formed by multiple coil conductors 31 electrically coupled together and is, for example, solenoidal in shape. The coil conductors 31 are stacked in the length direction L together with the insulating layers 15. It should be noted that in FIG. 7, the shape of the coil 30, the positions of the coil conductors 31, the coupling between the coil conductors 31, etc., are not illustrated exactly. For example, coil conductors 31 adjacent in the length direction L are electrically coupled together by via conductors not illustrated in FIG. 7.

The coil 30 has a coil axis C. The coil axis C of the coil 30 extends in the length direction L and runs between the first and second end surfaces 11*a* and 11*b* of the body 10 at the same time. That is, the direction of the coil axis C of the coil 30 is parallel with the first main surface 12*a*, which is the mounting surface, of the body 10. The coil axis C of the coil 30, furthermore, passes through the geometric center of the coil 30 when viewed in the length direction L.

In this way, the direction of stacking of the insulating layers 15 and the direction of the coil axis C of the coil 30 are parallel with the first main surface 12*a*, which is the mounting surface, of the body 10.

The direction of stacking of the insulating layers 15 and the direction of the coil axis C of the coil 30 may be parallel with the length direction L as illustrated in FIG. 7 or may not. For example, it may be that the direction of stacking of the insulating layers 15 is parallel with the width direction W, and the direction of the coil axis C of the coil 30 is parallel with the length direction L. Even in this case, the direction of stacking of the insulating layers 15 and the direction of the coil axis C of the coil 30 are parallel with the first main surface 12*a*, which is the mounting surface, of the body 10.

The multilayer coil component 1 may further have a first interlinking conductor 41 and a second interlinking conductor 42.

The first interlinking conductor 41 is formed by multiple via conductors, not illustrated in FIG. 7, electrically coupled together and stacked in the length direction L together with insulating layers 15. The first interlinking conductor 41 is exposed on the first end surface 11*a* of the body 10.

The first outer electrode 21 is electrically coupled to the coil 30 by the first interlinking conductor 41. Of the multiple coil conductors 31, the closest to the first end surface 11*a* of the body 10 is a coil conductor 31*a*. That is, the first outer electrode 21 is electrically coupled to a coil conductor 31*a* by the first interlinking conductor 41.

The first interlinking conductor 41 couples the first outer electrode 21 and the coil 30 together. Preferably, the first interlinking conductor 41 provides straight-line coupling between the first outer electrode 21 and the coil 30, between the first outer electrode 21 and the coil conductor 31*a* here. Preferably, when viewed in the length direction L, the first interlinking conductor 41 overlaps the coil conductor 31*a* and is closer than the coil axis C to the first main surface 12*a*, which is the mounting surface, of the body 10. These make electrical coupling between the first outer electrode 21 and the coil 30 easier.

The first interlinking conductor 41 providing straight-line coupling between the first outer electrode 21 and the coil 30 means that the via conductors forming the first interlinking conductor 41 overlap when viewed in the length direction L. The via conductors forming the first interlinking conductor 41, therefore, do not need to be arranged strictly in a straight line.

Preferably, the first interlinking conductor 41 is coupled to the portion of the coil conductor 31*a* closest to the first main surface 12*a* of the body 10. This helps reduce the area of the first outer electrode 21 on the first end surface 11*a* of the body 10. The resulting decrease in the stray capacitance between the first outer electrode 21 and the coil 30 improves the radiofrequency characteristics of the multilayer coil component 1 accordingly.

There may be only one first interlinking conductor 41, or there may be multiple ones.

The second interlinking conductor 42 is formed by multiple via conductors, not illustrated in FIG. 7, electrically coupled together and stacked in the length direction L together with insulating layers 15. The second interlinking conductor 42 is exposed on the second end surface 11*b* of the body 10.

The second outer electrode 22 is electrically coupled to the coil 30 by the second interlinking conductor 42. Of the multiple coil conductors 31, the closest to the second end surface 11*b* of the body 10 is a coil conductor 31*d*. That is, the second outer electrode 22 is electrically coupled to a coil conductor 31*d* by the second interlinking conductor 42.

The second interlinking conductor 42 couples the second outer electrode 22 and the coil 30 together. Preferably, the second interlinking conductor 42 provides straight-line coupling between the second outer electrode 22 and the coil 30, between the second outer electrode 22 and the coil conductor 31*d* here. Preferably, when viewed in the length direction L, the second interlinking conductor 42 overlaps the coil conductor 31*d* and is closer than the coil axis C to the first main surface 12*a*, which is the mounting surface, of the body 10. These make electrical coupling between the second outer electrode 22 and the coil 30 easier.

The second interlinking conductor 42 providing straight-line coupling between the second outer electrode 22 and the coil 30 means that the via conductors forming the second interlinking conductor 42 overlap when viewed in the length direction L. The via conductors forming the second interlinking conductor 42, therefore, do not need to be arranged strictly in a straight line.

Preferably, the second interlinking conductor 42 is coupled to the portion of the coil conductor 31*d* closest to the first main surface 12*a* of the body 10. This helps reduce the area of the second outer electrode 22 on the second end surface 11*b* of the body 10. The resulting decrease in the stray capacitance between the second outer electrode 22 and the coil 30 improves the radiofrequency characteristics of the multilayer coil component 1 accordingly.

There may be only one second interlinking conductor 42, or there may be multiple ones.

Preferably, the dimension $L_3$ of the coil 30 in the length direction L is 85% or more and 94% or less (i.e., from 85% to 94%), more preferably 90% or more and 94% or less (i.e., from 90% to 94%), of the dimension $L_2$ of the body 10 in the length direction L.

The dimension $L_3$ of the coil 30 in the length direction L indicates the distance in the length direction L from the coil conductor 31*a*, electrically coupled to the first outer electrode 21 by the first interlinking conductor 41, to the coil conductor 31*d*, electrically coupled to the second outer electrode 22 by the second interlinking conductor 42 (including the dimension of the coil conductors 31*a* and 31*d* in the length direction L). That is, the dimension $L_3$ of the coil 30 in the length direction L indicates the dimension in the length direction L of the region over which the coil conductors 31 are present.

If the dimension $L_3$ of the coil 30 in the length direction L is smaller than 85% of the dimension $L_2$ of the body 10 in the length direction L, a large stray capacitance of the coil 30 can affect the radiofrequency characteristics of the multilayer coil component 1. If the dimension $L_3$ of the coil 30 in the length direction L is larger than 94% of the dimension $L_2$ of the body 10 in the length direction L, a large stray capacitance between the first outer electrode 21 and the coil 30 and that between the second outer electrode 22 and the coil 30 can affect the radiofrequency characteristics of the multilayer coil component 1.

Figure 8:
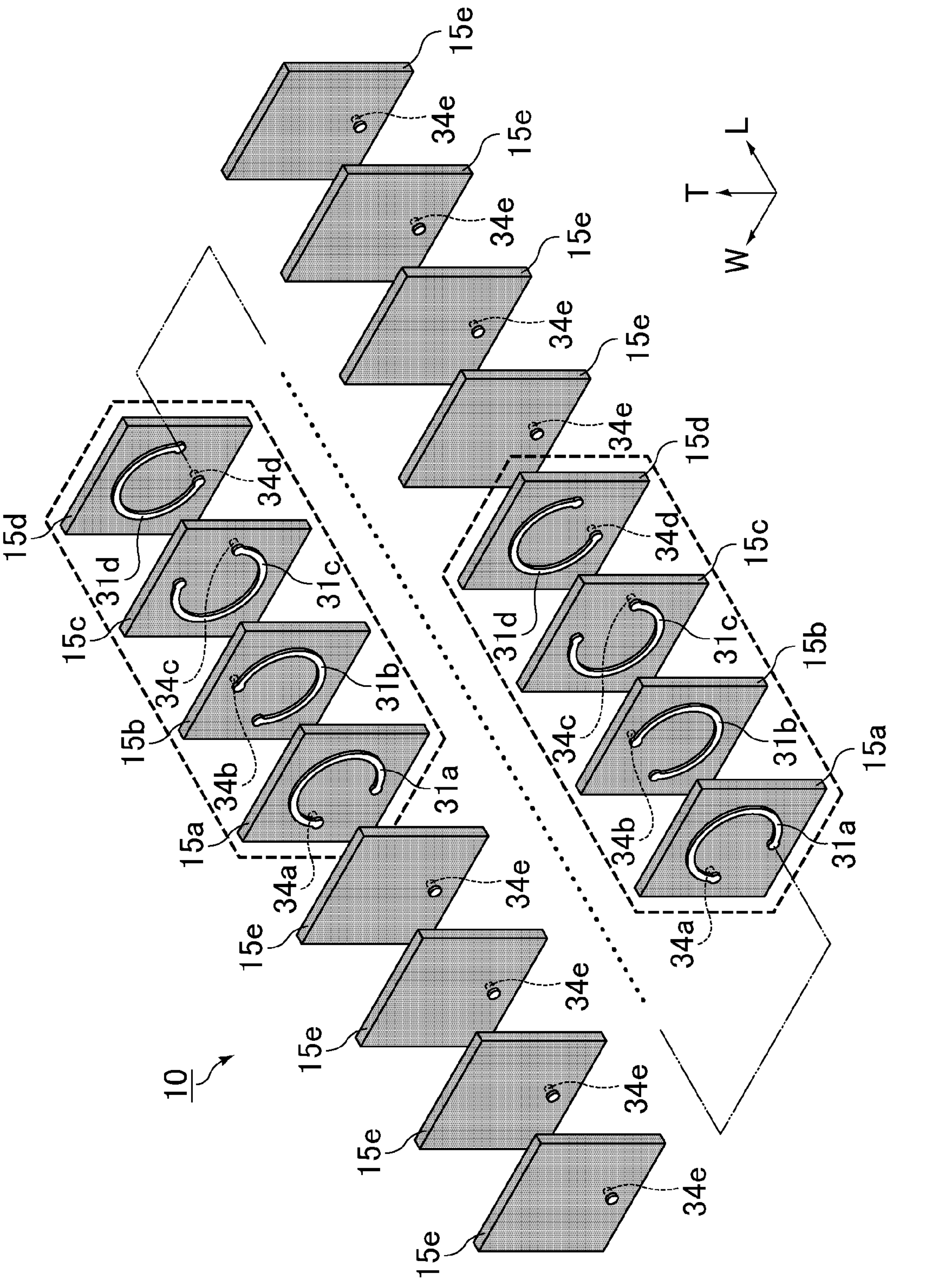
FIG. 8 is a perspective schematic diagram illustrating an example of a disassembled form of the body and coil in FIG. 7.
Figure 9:
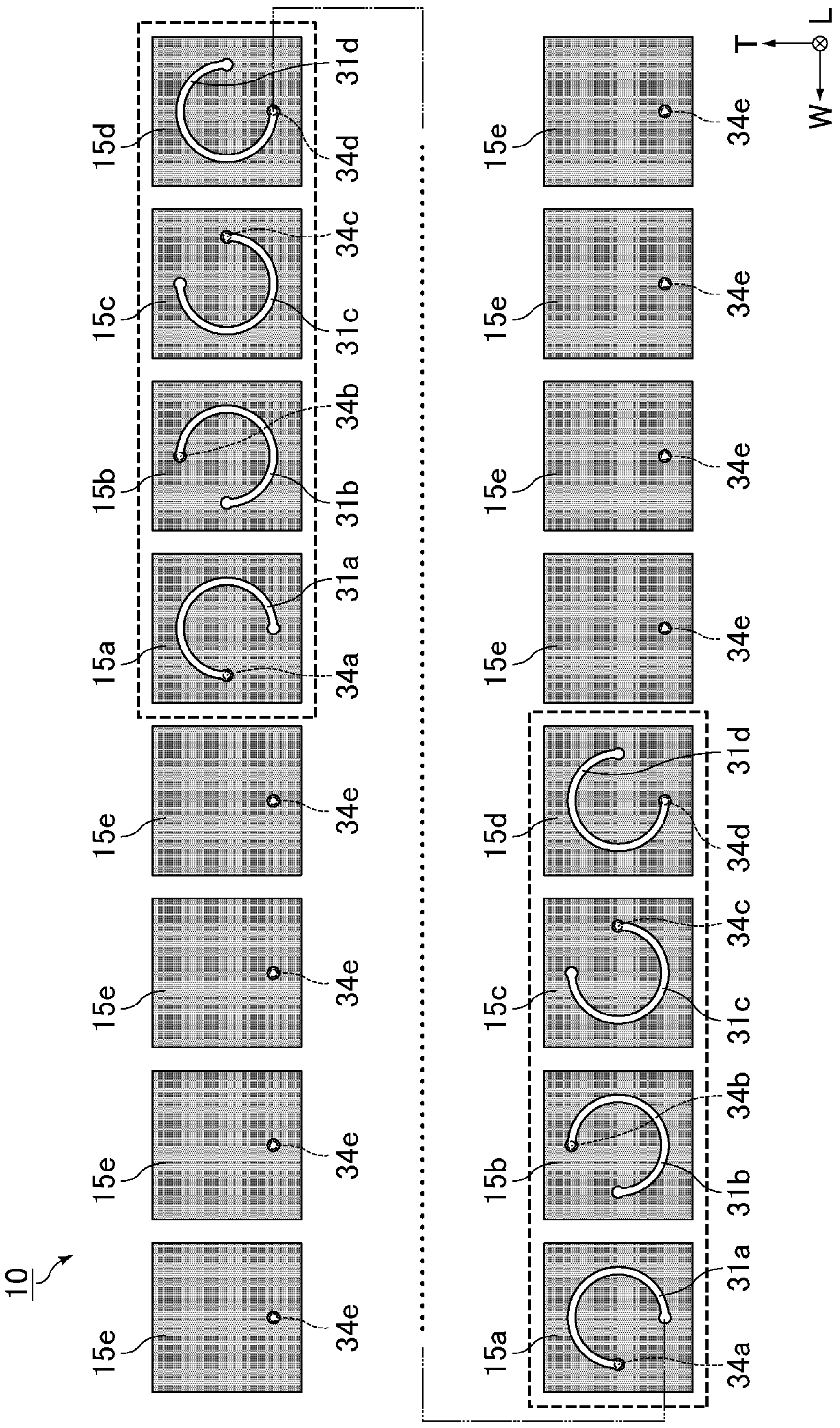
FIG. 9 is a plan schematic diagram illustrating an example of a disassembled form of the body and coil in FIG. 7.

FIG. 8 is a perspective schematic diagram illustrating an example of a disassembled form of the body and coil in FIG. 7. FIG. 9 is a plan schematic diagram illustrating an example of a disassembled form of the body and coil in FIG. 7.

In the example illustrated in FIGS. 8 and 9, the body 10 is formed by insulating layers 15*a*, 15*b*, 15*c*, 15*d*, and 15*e* as the insulating layers 15 stacked in a direction of stacking, in the length direction L here.

When what is stated applies to all of the insulating layers 15*a*, 15*b*, 15*c*, 15*d*, and 15*e* herein, the term insulating layers 15 is used.

On the primary surface of the insulating layers 15*a*, 15*b*, 15*c*, and 15*d* are coil conductors 31*a*, 31*b*, 31*c*, and 31*d*, respectively, as the coil conductors 31. The coil conductors 31*a*, 31*b*, 31*c*, and 31*d* are stacked in the length direction L together with the insulating layers 15*a*, 15*b*, 15*c*, and 15*d*, and each coil conductor is electrically coupled to one another.

When what is stated applies to all of the coil conductors 31*a*, 31*b*, 31*c*, and 31*d* herein, the term coil conductors 31 is used.

In the example illustrated in FIGS. 8 and 9, the length of each of the coil conductors 31*a*, 31*b*, 31*c*, and 31*d* is the length of ¾ turns of the coil 30. That is, the number of coil conductors that need to be stacked to form three turns of the coil 30 is four. Inside the body 10, coil conductors 31*a*, 31*b*, 31*c*, and 31*d* are stacked repeatedly as one unit (equivalent of three turns).

At both ends of the coil conductors 31, there may be a land portion. More specifically, there may be a land portion at both ends of the coil conductors 31*a*, 31*b*, 31*c*, and 31*d*.

When viewed in the length direction L, the land portions of the coil conductors 31 may be round or may be polygonal.

Insulating layers 15*a*, 15*b*, 15*c*, and 15*d* have via conductors 34*a*, 34*b*, 34*c*, and 34*d*, respectively, penetrating therethrough in the length direction L.

The via conductors 34*a*, 34*b*, 34*c*, and 34*d* are coupled to one end of the coil conductors 31*a*, 31*b*, 31*c*, and 31*d*, respectively. If there is a land portion at both ends of the coil conductors 31*a*, 31*b*, 31*c*, and 31*d* as stated above, this means the via conductors 34*a*, 34*b*, 34*c*, and 34*d* are coupled to a land portion of the coil conductors 31*a*, 31*b*, 31*c*, and 31*d*, respectively.

An insulating layer 15*a*, having a coil conductor 31*a* and a via conductor 34*a*, an insulating layer 15*b*, having a coil conductor 31*b* and a via conductor 34*b*, an insulating layer 15*c*, having a coil conductor 31*c* and a via conductor 34*c*, and an insulating layer 15*d*, having a coil conductor 31*d* and a via conductor 34*d*, are stacked repeatedly as one unit (a portion enclosed by dotted lines in FIGS. 8 and 9). This makes the coil conductors 31*a*, 31*b*, 31*c*, and 31*d* electrically coupled together by the via conductors 34*a*, 34*b*, 34*c*, and 34*d*. That is, coil conductors adjacent in the length direction L are electrically coupled together by via conductors.

In this way, a solenoidal coil 30 disposed inside the body 10 is constructed.

When viewed in the length direction L, the coil 30 may be round or may be polygonal. If the coil 30 includes land portions, for example if there is a land portion at both ends of the coil conductors 31, the shape of the coil 30 indicates the shape excluding the land portions.

Preferably, when viewed in the length direction L, the inner diameter of the coil conductors 31 is 15% or more and 40% or less (i.e., from 15% to 40%) of the dimension $W_2$ of the body 10 in the width direction W. The inner diameter of the coil conductors 31 is synonymous with the coil diameter of the coil 30. If the coil 30 is polygonal when viewed in the length direction L, the diameter of a circle equivalent in area to the polygon is deemed to be the coil diameter of the coil 30, or the inner diameter of the coil conductors 31.

Preferably, the number of turns of the coil 30 is 35 or more, more preferably 35 or more and 45 or less (i.e., from 35 to 45). Thirty-five or more turns in the coil 30 give the multilayer coil component 1 a high impedance, and therefore a high transmission coefficient S21 in the radiofrequency band, thereby improving the radiofrequency characteristics of the multilayer coil component 1.

An insulating layer 15*e* has a via conductor 34*e* penetrating therethrough in the length direction L.

On the primary surface of the insulating layer 15*e*, there may be a land portion coupled to the via conductor 34*e*.

Multiple ones of these insulating layers 15*e*, having a via conductor 34*e*, are stacked to cover the insulating layer 15*a*, having a coil conductor 31*a* and a via conductor 34*a*, located at one end of the coil 30. This makes the via conductors 34*e* electrically coupled together to form the first interlinking conductor 41, making the first interlinking conductor 41 exposed on the first end surface 11*a* of the body 10. As a result, the first outer electrode 21 and the coil conductor 31*a* are electrically coupled together by the first interlinking conductor 41.

Multiple ones of these insulating layers 15*e*, having a via conductor 34*e*, are stacked to cover the insulating layer 15*d*, having a coil conductor 31*d* and a via conductor 34*d*, located at the other end of the coil 30. This makes the via conductors 34*e* electrically coupled together to form the second interlinking conductor 42, making the second interlinking conductor 42 exposed on the second end surface 11*b* of the body 10. As a result, the second outer electrode 22 and the coil conductor 31*d* are electrically coupled together by the second interlinking conductor 42.

Preferably, the dimension of the first interlinking conductor 41 in the length direction L and that of the second interlinking conductor 42 are each 2.5% or more and 7.5% or less (i.e., from 2.5% to 7.5%), more preferably 2.5% or more and 5.0% or less (i.e., from 2.5% to 5.0%), of the dimension $L_2$ of the body 10 in the length direction L. The resulting small inductance of the first and second interlinking conductors 41 and 42 improves the radiofrequency characteristics of the multilayer coil component 1.

Preferably, the dimension of the first interlinking conductor 41 in the width direction W and that of the second interlinking conductor 42 are each 8.0% or more and 20% or less (i.e., from 8.0% to 20%) of the dimension $W_2$ of the body 10 in the width direction W.

For when the multilayer coil component 1 is the 0603, 0402, or 1005 size, the following presents specific examples of preferred dimensions of the coil conductors 31, first interlinking conductor 41, and second interlinking conductor 42.

(1) When the multilayer coil component 1 is the 0603 size

Preferably, when viewed in the length direction L, the inner diameter of the coil conductors 31 is 50 μm or more and 100 μm or less (i.e., from 50 μm to 100 μm).

Preferably, the dimension of the first interlinking conductor 41 in the length direction L and that of the second interlinking conductor 42 are each 15 μm or more and 45 μm or less (i.e., from 15 μm to 45 μm), more preferably 15 μm or more and 30 μm or less (i.e., from 15 μm to 30 μm).

Preferably, the dimension of the first interlinking conductor 41 in the width direction W and that of the second interlinking conductor 42 are each 30 μm or more and 60 μm or less (i.e., from 30 μm to 60 μm).

(2) When the multilayer coil component 1 is the 0402 size

Preferably, when viewed in the length direction L, the inner diameter of the coil conductors 31 is 30 μm or more and 70 μm or less (i.e., from 30 μm to 70 μm).

Preferably, the dimension of the first interlinking conductor 41 in the length direction L and that of the second interlinking conductor 42 are each 10 μm or more and 30 μm or less (i.e., from 10 μm to 30 μm), more preferably 10 μm or more and 25 μm or less (i.e., from 10 μm to 25 μm).

Preferably, the dimension of the first interlinking conductor 41 in the width direction W and that of the second interlinking conductor 42 are each 20 μm or more and 40 μm or less (i.e., from 20 μm to 40 μm).

(3) When the multilayer coil component 1 is the 1005 size

Preferably, when viewed in the length direction L, the inner diameter of the coil conductors 31 is 80 μm or more and 170 μm or less (i.e., from 80 μm to 170 μm).

Preferably, the dimension of the first interlinking conductor 41 in the length direction L and that of the second interlinking conductor 42 are each 25 μm or more and 75 μm or less (i.e., from 25 μm to 75 μm), more preferably 25 μm or more and 50 μm or less (i.e., from 25 μm to 50 μm).

Preferably, the dimension of the first interlinking conductor 41 in the width direction W and that of the second interlinking conductor 42 are each 40 μm or more and 100 μm or less (i.e., from 40 μm to 100 μm).

As for the material for forming the coil conductors 31*a*, 31*b*, 31*c*, and 31*d* and the via conductors 34*a*, 34*b*, 34*c*, 34*d*, and 34*e*, examples include Ag, Au, Cu, Pd, Ni, Al, and alloys containing at least one of these metals.

In the first and second aspects of the multilayer coil component according to the present disclosure, when a boundary is defined that extends parallel with the height and width directions at the midpoint of the body in the length direction, the body has first and second body sections aligned in the length direction with the boundary therebetween, the first body section including the first end surface and the second body section including the second end surface.

Figure 10:
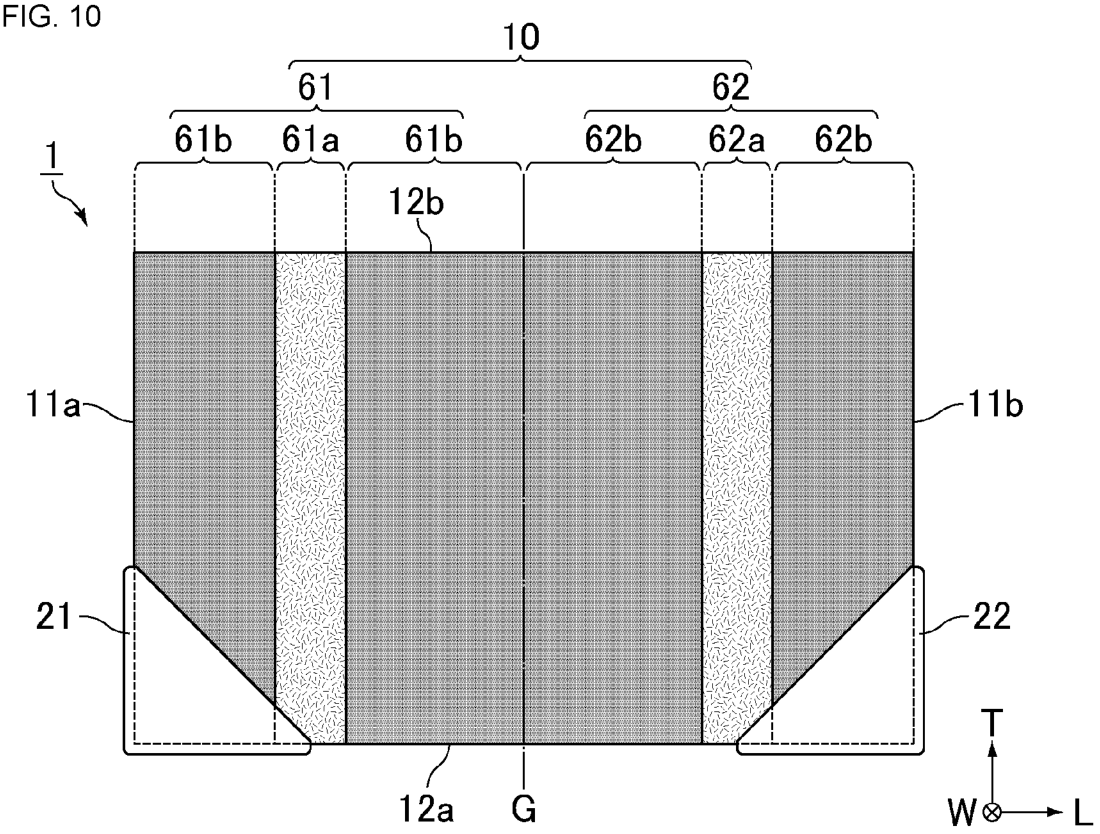
FIG. 10 is a side schematic view of the multilayer coil component in FIG. 1.

FIG. 10 is a side schematic view of the multilayer coil component in FIG. 1.

As illustrated in FIG. 10, when, for the multilayer coil component 1, a boundary G is defined that extends parallel with the height and width directions T and W at the midpoint of the body 10 in the length direction L, the body 10 has first and second body sections 61 and 62 aligned in the length direction L with the boundary G therebetween, the first body section 61 including the first end surface 11*a* and the second body section 62 including the second end surface 11*b*. That is, the body 10 is divided into two, first and second body sections 61 and 62, by a boundary G in the length direction L.

Regarding the boundary G, the midpoint of the body 10 in the length direction L is determined as the point that bisects the maximum dimension of the body 10 in the length direction L.

The first outer electrode 21 is on the surface of the first body section 61.

The second outer electrode 22 is on the surface of the second body section 62.

In the first and second aspects of the multilayer coil component according to the present disclosure, the first outer electrode has, in order from the body side, an underlying electrode and a plating electrode on the underlying electrode.

Figure 11:
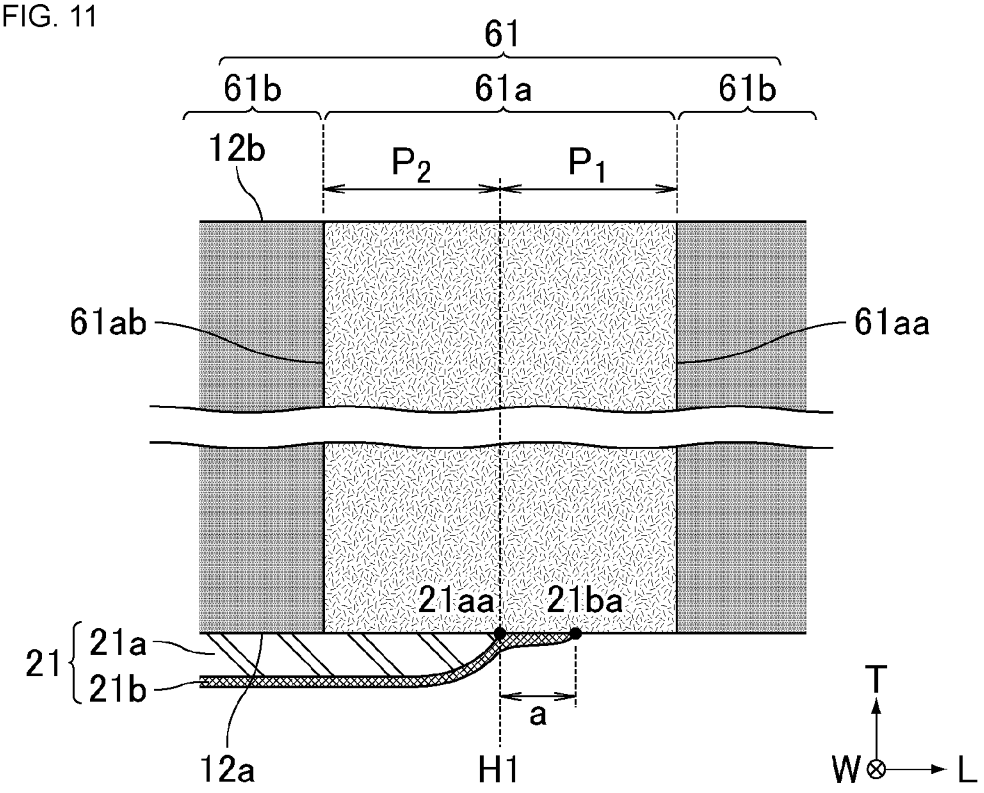
FIG. 11 is a schematic diagram illustrating part of a cross-section of the first body section and first outer electrode in FIG. 10 parallel with the length and height directions.

FIG. 11 is a schematic diagram illustrating part of a cross-section of the first body section and first outer electrode in FIG. 10 parallel with the length and height directions.

As illustrated in FIG. 11, the first outer electrode 21 has, in order from the body 10 side, an underlying electrode 21*a* and a plating electrode 21*b* on the underlying electrode 21*a*.

The end 21*ba* in the length direction L of the portion of the plating electrode 21*b* lying on the first main surface 12*a* of the body 10 is closer to the second end surface 11*b* of the body 10 (right in FIG. 11) than the end 21*aa* in the length direction L of the portion of the underlying electrode 21*a* lying on the first main surface 12*a* of the body 10.

The end in the length direction of the underlying electrode lying on the first main surface of the body and the end in the length direction of the plating electrode lying on the first main surface of the body are determined on a cross-section of the multilayer coil component extending parallel with the length and height directions substantially in the middle in the width direction.

Preferably, the distance a in the length direction L between the end 21*ba* in the length direction L of the portion of the plating electrode 21*b* lying on the first main surface 12*a* of the body 10 and the end 21*aa* in the length direction L of the portion of the underlying electrode 21*a* lying on the first main surface 12*a* of the body 10 is 30 μm or less. More specifically, it is preferred that the distance a in the length direction L between the end 21*ba* of the plating electrode 21*b* and the end 21*aa* of the underlying electrode 21*a* be greater than 0 μm and 30 μm or less (i.e., from 0 μm to 30 μm).

Preferably, the underlying electrode 21*a* contains Ag.

Preferably, the plating electrode 21*b* contains at least one of Ni or Sn.

The plating electrode 21*b* may have a single-layer structure or may have a multilayer structure, but preferably has a multilayer structure. If the plating electrode 21*b* has a multilayer structure, it is preferred that the plating electrode 21*b* have, in order from the underlying electrode 21*a* side, a Ni plating electrode and a Sn plating electrode.

Plating electrodes like the plating electrode 21*b* are differentiated from underlying electrodes formed by non-plating processes like the underlying electrode 21*a* by elemental analysis by energy-dispersive X-ray spectroscopy (EDX) and based on information such as being dense in a cross-section parallel with the length and height directions like that illustrated in FIG. 11.

In the first and second aspects of the multilayer coil component according to the present disclosure, when a first reference position is defined that coincides in the height direction with the end in the length direction of the portion of the underlying electrode lying on the first main surface of the body, the first body section has first and second regions, the first region including at least the range having a dimension in the length direction of 20 μm from the first reference position toward the second end surface and the second region being all but the first region.

For the multilayer coil component 1, when a first reference position H1 is defined that coincides in the height direction T with the end 21*aa* in the length direction L of the portion of the underlying electrode 21*a* lying on the first main surface 12*a* of the body 10, the first body section 61 has a first region 61*a* including at least the range having a dimension $P_1$ in the length direction L of 20 μm from the first reference position H1 toward the second end surface 11*b* (to the right in FIG. 11). That is, the first region 61*a* includes at least the range from the point at which the distance $P_1$ in the length direction L from the first reference position H1 toward the second end surface 11*b* is 0 μm to the point at which the distance $P_1$ is 20 μm.

Preferably, the end 61*aa* of the first region 61*a* on the second end surface 11*b* side is at the point where the distance $P_1$ in the length direction L from the first reference position H1 is 20 μm or more and 60 μm or less (i.e., from 20 μm to 60 μm). That is, it is preferred that the first region 61*a* include a range from the point at which the distance $P_1$ in the length direction L from the first reference position H1 toward the second end surface 11*b* is 0 μm to the point at which the distance $P_1$ is $\alpha_1$ μm ($20 \le \alpha_1 \le 60$).

Preferably, the first region 61*a* further includes at least the range having a dimension $P_2$ in the length direction L of 20 μm from the first reference position H1 toward the first end surface 11*a* (to the left in FIG. 11). That is, it is preferred that the first region 61*a* further include at least the range from the point at which the distance $P_2$ in the length direction L from the first reference position H1 toward the first end surface 11*a* is 0 μm to the point at which the distance $P_2$ is 20 μm.

Preferably, the end 61*ab* of the first region 61*a* on the first end surface 11*a* side is at the point where the distance $P_2$ in the length direction L from the first reference position H1 is 20 μm or more and 60 μm or less (i.e., from 20 μm to 60 μm). That is, it is preferred that the first region 61*a* further include a range from the point at which the distance $P_2$ in the length direction L from the first reference position H1 toward the first end surface 11*a* is 0 μm to the point at which the distance $P_2$ is $\alpha_2$ μm ($20 \le \alpha_2 \le 60$).

A plating electrode in an outer electrode having substrate and plating electrodes like those of the multilayer coil component according to the present disclosure can stretch much larger than the underlying electrode along the surface of the body. If an outer electrode is formed with such an overgrown plating electrode, the stray capacity between the outer electrode and the coil can be so large that it will affect the radiofrequency characteristics of the multilayer coil component.

To address this, in the first aspect of the multilayer coil component according to the present disclosure, the percentage by volume of the nonmagnetic phase to the total volume of the magnetic phase and nonmagnetic phase in the first region is 60% by volume or more.

For the multilayer coil component 1, the percentage by volume of the nonmagnetic phase to the total volume of the magnetic phase and nonmagnetic phase in the first region 61*a* is 60% by volume or more. More specifically, in the first region 61*a*, the percentage by volume of the nonmagnetic phase to the total volume of the magnetic phase and nonmagnetic phase is 60% by volume or more and 100% by volume or less (i.e., from 60% by volume to 100% by volume). This prevents the plating electrode 21*b* from greatly outgrowing the underlying electrode 21*a* along the first main surface 12*a* of the body 10 during its formation. The end 21*ba* of the plating electrode 21*b*, therefore, is forced to stay, preferably at a point where it is within the first region 61*a* as illustrated in FIG. 11. The stray capacity between the coil 30 and the first outer electrode 21 is prevented from being large; as a result, the radiofrequency characteristics of the multilayer coil component 1 are improved accordingly.

If in the first region 61*a* the percentage by volume of the nonmagnetic phase to the total volume of the magnetic phase and nonmagnetic phase is smaller than 60% by volume, metal(s) easily segregates itself to the first main surface 12*a* of the body 10. The plating electrode 21*b*, therefore, tends to greatly outgrow the underlying electrode 21*a* along the first main surface 12*a* of the body 10 during its formation.

In the first region 61*a*, the percentage by volume of the nonmagnetic phase to the total volume of the magnetic phase and nonmagnetic phase may be 100% by volume. That is, the first region 61*a* may be totally the nonmagnetic phase.

The first body section 61 also has a second region 61*b*, which is all but the first region 61*a*.

In the first aspect of the multilayer coil component according to the present disclosure, the percentage by volume of the nonmagnetic phase to the total volume of the magnetic phase and nonmagnetic phase in the second region is 50% by volume or less.

For the multilayer coil component 1, the percentage by volume of the nonmagnetic phase to the total volume of the magnetic phase and nonmagnetic phase in the second region 61*b* is 50% by volume or less. More specifically, in the second region 61*b*, the percentage by volume of the nonmagnetic phase to the total volume of the magnetic phase and nonmagnetic phase is 0% or more and 50% by volume or less (i.e., from 0% or more to 50% by volume). This makes the percentage by volume of the nonmagnetic phase to the total volume of the magnetic phase and nonmagnetic phase smaller in the second region 61*b* than in the first region 61*a*, and the resulting high impedance of the multilayer coil component 1 improves the radiofrequency characteristics of the multilayer coil component 1.

In the second region 61*b*, the percentage by volume of the nonmagnetic phase to the total volume of the magnetic phase and nonmagnetic phase may be 0% by volume. That is, the second region 61*b* may be totally the magnetic phase.

Overall, in the first aspect of the multilayer coil component according to the present disclosure, the percentage by volume of the nonmagnetic phase to the total volume of the magnetic phase and nonmagnetic phase in the first region is 60% by volume or more, and the percentage by volume of the nonmagnetic phase to the total volume of the magnetic phase and nonmagnetic phase in the second region is 50% by volume or less. By virtue of this, even though its outer electrode, first outer electrode here, has a plating electrode, the multilayer coil component is superior in radiofrequency characteristics. That is, in its first aspect, the multilayer coil component according to the present disclosure has a high transmission coefficient S21 in the radiofrequency band and is consistent in the transmission coefficient S21 in the radiofrequency and lower-frequency bands.

The magnetic phase contains, for example, Fe, Ni, Zn, and Cu.

The magnetic phase may further contain Co, Bi, Sn, Mn, etc.

Preferably, the magnetic phase is formed by a Ni—Cu—Zn ferrite material.

Preferably, the Ni—Cu—Zn ferrite material contains, in a total of 100 mol %, 40 mol % or more and 49.5 mol % or less (i.e., from 40 mol % to 49.5 mol %) Fe in terms of an Fe2O3 basis, 10 mol % or more and 45 mol % or less (i.e., from 10 mol % to 45 mol %) Ni in terms of a NiO basis, 2 mol % or more and 35 mol % or less (i.e., from 2 mol % to 35 mol %) Zn in terms of a ZnO basis, and 6 mol % or more and 13 mol % or less (i.e., from 6 mol % to 13 mol %) Cu in terms of a CuO basis.

The Ni—Cu—Zn ferrite material may further contain, for example, dopants or inevitable impurities, such as Co, Bi, Sn, and Mn.

The nonmagnetic phase contains, for example, Si.

Preferably, the nonmagnetic phase is formed by a borosilicate glass material.

Preferably, the borosilicate glass material contains, in a total of 100% by weight, 70% by weight or more and 85% by weight or less (i.e., from 70% by weight to 85% by weight) Si in terms of a $SiO_2$ basis, 10% by weight or more and 25% by weight or less (i.e., from 10% by weight to 25% by weight) B in terms of a B2O3 basis, 0.5% by weight or more and 5% by weight or less (i.e., from 0.5% by weight to 5% by weight) alkali metal A on an $A_2O$ basis, and 0% by weight or more and 5% by weight or less (i.e., from 0% by weight to 5% by weight) Al on an $Al_2O_3$ basis.

The borosilicate glass material may further contain forsterite ($2MgO{\cdot}SiO_2$), quartz ($SiO_2$), etc., as filler.

The nonmagnetic phase may be formed by an oxide represented by $aZnO{\cdot}SiO_2$ (a is 1.8 or more and 2.2 or less (i.e., from 1.8 to 2.2)). Examples of such oxides include the $Zn_2SiO_4$ called willemite. Such an oxide may contain Cu in place of part of Zn.

The magnetic phase and nonmagnetic phase are differentiated as follows. First, the multilayer coil component is polished to substantially the middle in the width direction to expose a cross-section parallel with the length and height directions like that illustrated in, for example, FIGS. 7 and 11. Then the exposed cross-section of the body is subjected to elemental mapping by scanning transmission electron microscopy-energy-dispersive X-ray spectroscopy (STEM-EDX). Then the two phases are differentiated: the regions in which Fe is present constitute the magnetic phase, and the regions in which Si is present constitute the nonmagnetic phase.

In each of the first and second regions, the percentage by volume of the nonmagnetic phase to the total volume of the magnetic phase and nonmagnetic phase is determined as follows. First, the multilayer coil component is polished to substantially the middle in the width direction to expose a cross-section parallel with the length and height directions like that illustrated in, for example, FIGS. 7 and 11. Then, if the percentage by volume of the nonmagnetic phase in the first region is measured on the exposed cross-section in the first body section, the range having a dimension in the length direction of 20 μm from the first reference position toward the second end surface is selected as the region of interest. If the percentage by volume of the nonmagnetic phase in the second region is measured on the exposed cross-section in the first body section, the range having a dimension in the length direction of 20 μm from the first end surface toward the second end surface is selected as the region of interest. Within that region of interest three 20-μm square areas are picked, and then the magnetic phase and nonmagnetic phase are differentiated as described above by performing elemental mapping by scanning transmission electron microscopy-energy-dispersive X-ray spectroscopy. After that, in each of these three areas, the percentage by area of the nonmagnetic phase to the total area of the magnetic phase and nonmagnetic phase is measured on the elemental mapping image using image analysis software. Then these measured percentages by area are averaged, and the calculated average is reported as the percentage by volume of the nonmagnetic phase to the total volume of the magnetic phase and nonmagnetic phase.

In the first aspect of the multilayer coil component according to the present disclosure, it is preferred that the first region contain, in a total of 100% by weight, 30.0% by weight or more and 85.0% by weight or less (i.e., from 30.0% by weight to 85.0% by weight) Si in terms of a $SiO_2$ basis, 4.0% by weight or more and 15.0% by weight or less (i.e., from 4.0% by weight to 15.0% by weight) B in terms of a B2O3 basis, 0% by weight or more and 45.0% by weight or less (i.e., from 0% by weight to 45.0% by weight) Fe in terms of an Fe2O3 basis, 0% by weight or more and 15.0% by weight (i.e., from 0% by weight to 15.0% by weight) Ni in terms of a NiO basis, 0% by weight or more and 8.0% by weight or less (i.e., from 0% by weight to 8.0% by weight) Zn in terms of a ZnO basis, and 0% by weight or more and 5.0% by weight or less (i.e., from 0% by weight to 5.0% by weight) Cu in terms of a CuO basis.

For the multilayer coil component 1, it is preferred that the first region 61*a* contain, in a total of 100% by weight, 30.0% by weight or more and 85.0% by weight or less (i.e., from 30.0% by weight to 85.0% by weight) Si in terms of a $SiO_2$ basis, 4.0% by weight or more and 15.0% by weight or less (i.e., from 4.0% by weight to 15.0% by weight) B in terms of a B2O3 basis, 0% by weight or more and 45.0% by weight or less (i.e., from 0% by weight to 45.0% by weight) Fe in terms of an Fe2O3 basis, 0% by weight or more and 15.0% by weight (i.e., from 0% by weight to 15.0% by weight) Ni in terms of a NiO basis, 0% by weight or more and 8.0% by weight or less (i.e., from 0% by weight to 8.0% by weight) Zn in terms of a ZnO basis, and 0% by weight or more and 5.0% by weight or less (i.e., from 0% by weight to 5.0% by weight) Cu in terms of a CuO basis.

Preferably, the first region 61*a* further contains, in a total of 100% by weight, 0.3% by weight or more and 1.5% by weight or less (i.e., from 0.3% by weight to 1.5% by weight) K in terms of a K2O basis and 0.9% by weight or more and 3.5% by weight or less (i.e., from 0.9% by weight to 3.5% by weight) Mg in terms of a MgO basis.

In the first aspect of the multilayer coil component according to the present disclosure, it is preferred that the second region contain, in a total of 100% by weight, 0% by weight or more and 25.0% by weight or less (i.e., from 0% by weight to 25.0% by weight) Si in terms of a $SiO_2$ basis, 0% by weight or more and 5.0% by weight or less (i.e., from 0% by weight to 5.0% by weight) B in terms of a B2O3 basis, 45.0% by weight or more and 70.0% by weight or less (i.e., from 45.0% by weight to 70.0% by weight) Fe in terms of an Fe2O3 basis, 10.0% by weight or more and 20.0% by weight or less (i.e., from 10.0% by weight to 20.0% by weight) Ni in terms of a NiO basis, and 5.0% by weight or more and 12.0% by weight or less (i.e., from 5.0% by weight to 12.0% by weight) Zn in terms of a ZnO basis.

For the multilayer coil component 1, it is preferred that the second region 61*b* contain, in a total of 100% by weight, 0% by weight or more and 25.0% by weight or less (i.e., from 0% by weight to 25.0% by weight) Si in terms of a $SiO_2$ basis, 0% by weight or more and 5.0% by weight or less (i.e., from 0% by weight to 5.0% by weight) B in terms of a B2O3 basis, 45.0% by weight or more and 70.0% by weight or less (i.e., from 45.0% by weight to 70.0% by weight) Fe in terms of an Fe2O3 basis, 10.0% by weight or more and 20.0% by weight or less (i.e., from 10.0% by weight to 20.0% by weight) Ni in terms of a NiO basis, and 5.0% by weight or more and 12.0% by weight or less (i.e., from 5.0% by weight to 12.0% by weight) Zn in terms of a ZnO basis.

Preferably, the Si content of the first region 61*a* in a total of 100% by weight is larger than the Si content of the second region 61*b* in a total of 100% by weight by 7.0% by weight or more in terms of a $SiO_2$ basis. That is, it is preferred that the difference between the Si content of the first region 61*a* in a total of 100% by weight and the Si content of the second region 61*b* in a total of 100% by weight be 7.0% by weight or more in terms of a $SiO_2$ basis. Preferably, furthermore, the difference between the Si content of the first region 61*a* in a total of 100% by weight and the Si content of the second region 61*b* in a total of 100% by weight is 60.0% by weight or less. The Si content of the second region 61*b* in a total of 100% by weight may be 0% by weight.

The composition of the first and second regions is checked by analyzing each region of interest described above by inductively coupled plasma atomic emission spectroscopy/mass spectrometry (ICP-AES/MS).

Preferably, the second body section 62 and the second outer electrode 22, too, have the same structure and construction as the first body section 61 and the first outer electrode 21 as presented below.

Figure 12:
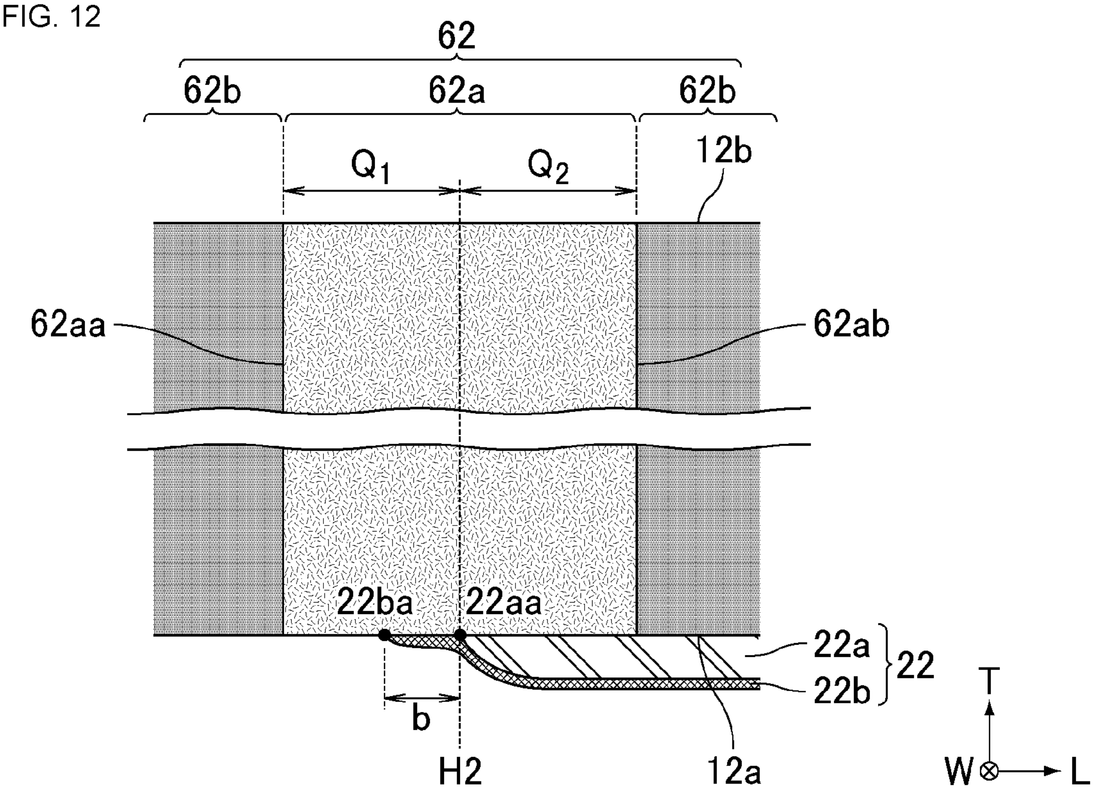
FIG. 12 is a schematic diagram illustrating part of a cross-section of the second body section and second outer electrode in FIG. 10 parallel with the length and height directions.

FIG. 12 is a schematic diagram illustrating part of a cross-section of the second body section and second outer electrode in FIG. 10 parallel with the length and height directions.

As illustrated in FIG. 12, the second outer electrode 22 has, in order from the body 10 side, an underlying electrode 22*a* and a plating electrode 22*b* on the underlying electrode 22*a*.

The end 22*ba* in the length direction L of the portion of the plating electrode 22*b* lying on the first main surface 12*a* of the body 10 is closer to the first end surface 11*a* of the body 10 (left in FIG. 11) than the end 22*aa* in the length direction L of the portion of the underlying electrode 22*a* lying on the first main surface 12*a* of the body 10.

Preferably, the distance b in the length direction L between the end 22*ba* in the length direction L of the portion of the plating electrode 22*b* lying on the first main surface 12*a* of the body 10 and the end 22*aa* in the length direction L of the portion of the underlying electrode 22*a* lying on the first main surface 12*a* of the body 10 is 30 μm or less. More specifically, it is preferred that the distance b in the length direction L between the end 22*ba* of the plating electrode 22*b* and the end 22*aa* of the underlying electrode 22*a* be greater than 0 μm and 30 μm or less (i.e., from 0 μm to 30 μm).

A preferred structure and construction for the substrate and plating electrodes 22*a* and 22*b* is the same as a preferred structure and construction for the substrate and plating electrodes 21*a* and 21*b*, respectively.

When a second reference position H2 is defined that coincides in the height direction T with the end 22*aa* in the length direction L of the portion of the underlying electrode 22*a* lying on the first main surface 12*a* of the body 10, the second body section 62 has a first region 62*a* including at least the range having a dimension $Q_1$ in the length direction L of 20 μm from the second reference position H2 toward the first end surface 11*a* (to the left in FIG. 12). That is, the first region 62*a* includes at least the range from the point at which the distance $Q_1$ in the length direction L from the second reference position H2 toward the first end surface 11*a* is 0 μm to the point at which the distance $Q_1$ is 20 μm.

Preferably, the end 62*aa* of the first region 62*a* on the first end surface 11*a* side is at the point where the distance $Q_1$ in the length direction L from the second reference position H2 is 20 μm or more and 60 μm or less (i.e., from 20 μm to 60 μm). That is, it is preferred that the first region 62*a* include a range from the point at which the distance $Q_1$ in the length direction L from the second reference position H2 toward the first end surface 11*a* is 0 μm to the point at which the distance $Q_1$ is $\beta_1$ μm ($20 \leq \beta_1 \leq 60$).

Preferably, the first region 62*a* further includes at least the range having a dimension $Q_2$ in the length direction L of 20 μm from the second reference position H2 toward the second end surface 11*b* (to the right in FIG. 12). That is, it is preferred that the first region 62*a* further include at least the range from the point at which the distance $Q_2$ in the length direction L from the second reference position H2 toward the second end surface 11*b* is 0 μm to the point at which the distance $Q_2$ is 20 μm.

Preferably, the end 62*ab* of the first region 62*a* on the second end surface 11*b* side is at the point where the distance $Q_2$ in the length direction L from the second reference position H2 is 20 μm or more and 60 μm or less (i.e., from 20 μm to 60 μm). That is, it is preferred that the first region 62*a* further include a range from the point at which the distance $Q_2$ in the length direction L from the second reference position H2 toward the second end surface 11*b* is 0 μm to the point at which the distance $Q_2$ is $\beta_2$ μm ($20 \leq \beta_1 \leq 60$).

In the first region 62*a*, the percentage by volume of the nonmagnetic phase to the total volume of the magnetic phase and nonmagnetic phase is 60% by volume or more. More specifically, in the first region 62*a*, the percentage by volume of the nonmagnetic phase to the total volume of the magnetic phase and nonmagnetic phase is 60% by volume or more and 100% by volume or less (i.e., from 60% by volume to 100% by volume).

The second body section 62 also has a second region 62*b*, which is all but the first region 62*a*.

In the second region 62*b*, the percentage by volume of the nonmagnetic phase to the total volume of the magnetic phase and nonmagnetic phase is 50% by volume or less. More specifically, in the second region 62*b*, the percentage by volume of the nonmagnetic phase to the total volume of the magnetic phase and nonmagnetic phase is 0% or more and 50% by volume or less (i.e., from 0% to 50% by volume).

For the second body section, too, the percentage by volume of the nonmagnetic phase to the total volume of the magnetic phase and nonmagnetic phase in each of the first and second regions is determined as described above. This time, if the percentage by volume of the nonmagnetic phase in the first region is measured on the exposed cross-section in the second body section, the range having a dimension in the length direction of 20 μm from the second reference position toward the first end surface is selected as the region of interest. If the percentage by volume of the nonmagnetic phase in the second region is measured on the exposed cross-section in the second body section, the range having a dimension in the length direction of 20 μm from the second end surface toward the first end surface is selected as the region of interest.

A preferred composition for the first and second regions 62*a* and 62*b* is the same as a preferred composition for the first and second regions 61*a* and 61*b*, respectively.

In the second aspect of the multilayer coil component according to the present disclosure, the first region, with respect to the first body section, contains, in a total of 100% by weight, 30.0% by weight or more and 85.0% by weight or less (i.e., from 30.0% by weight to 85.0% by weight) Si in terms of a $SiO_2$ basis, 4.0% by weight or more and 15.0% by weight or less (i.e., from 4.0% by weight to 15.0% by weight) B in terms of a B2O3 basis, 0% by weight or more and 45.0% by weight or less (i.e., from 0% by weight to 45.0% by weight) Fe in terms of an Fe2O3 basis, 0% by weight or more and 15.0% by weight (i.e., from 0% by weight to 15.0% by weight) Ni in terms of a NiO basis, 0% by weight or more and 8.0% by weight or less (i.e., from 0% by weight to 8.0% by weight) Zn in terms of a ZnO basis, and 0% by weight or more and 5.0% by weight or less (i.e., from 0% by weight to 5.0% by weight) Cu in terms of a CuO basis as in the foregoing preferred configuration in the first aspect of the multilayer coil component according to the present disclosure.

In the second aspect of the multilayer coil component according to the present disclosure, the second region, with respect to the first body section, contains, in a total of 100% by weight, 0% by weight or more and 25.0% by weight or less (i.e., from 0% by weight to 25.0% by weight) Si in terms of a $SiO_2$ basis, 0% by weight or more and 5.0% by weight or less (i.e., from 0% by weight to 5.0% by weight) B in terms of a B2O3 basis, 45.0% by weight or more and 70.0% by weight or less (i.e., from 45.0% by weight to 70.0% by weight) Fe in terms of an Fe2O3 basis, 10.0% by weight or more and 20.0% by weight or less (i.e., from 10.0% by weight to 20.0% by weight) Ni in terms of a NiO basis, and 5.0% by weight or more and 12.0% by weight or less (i.e., from 5.0% by weight to 12.0% by weight) Zn in terms of a ZnO basis as in the foregoing preferred configuration in the first aspect of the multilayer coil component according to the present disclosure.

In its second aspect, too, the multilayer coil component according to the present disclosure has a high and consistent transmission coefficient S21 in the radiofrequency band like the first aspect of the multilayer coil component according to the present disclosure.

A preferred composition (Si and other chemical makeup) for the first and second regions of the first body section in the second aspect of the multilayer coil component according to the present disclosure is the same as a preferred composition for the first and second regions, respectively, of the first body section in the foregoing first aspect of the multilayer coil component according to the present disclosure.

For the second aspect of the multilayer coil component according to the present disclosure, too, it is preferred that it have a second body section and a second outer electrode in the same structure and construction as the first body section and the first outer electrode, respectively.

In the second aspect of the multilayer coil component according to the present disclosure, a preferred composition (Si and other chemical makeup) for the first and second regions of the second body section is the same as a preferred composition for the first and second regions, respectively, of the first body section.

The multilayer coil component 1 is produced by, for example, the following method.

Magnetic Material Preparation Step

First, predetermined proportions of $Fe_2O_3$, NiO, ZnO, and CuO are weighed out.

Then these measured materials are wet-mixed and then ground to give slurry.

The duration of mixing of the materials is, for example, 4 hours or more and 8 hours or less (i.e., from 4 hours to 8 hours).

Then the resulting slurry is dried and then calcined. The calcination temperature is, for example, 700° C. or above and 800° C. or below (i.e., from 700° C. to 800° C.). The duration of calcination is, for example, 2 hours or more and 5 hours or less (i.e., from 2 hours to 5 hours).

In such a way, a powdery magnetic material, more specifically a powdery ferrite material, is prepared.

Preferably, the ferrite material contains, in a total of 100 mol %, 40 mol % or more and 49.5 mol % or less (i.e., from 40 mol % to 49.5 mol %) Fe in terms of an Fe2O3 basis, 10 mol % or more and 45 mol % or less (i.e., from 10 mol % to 45 mol %) Ni in terms of a NiO basis, 2 mol % or more and 35 mol % or less (i.e., from 2 mol % to 35 mol %) Zn in terms of a ZnO basis, and 6 mol % or more and 13 mol % or less (i.e., from 6 mol % to 13 mol %) Cu in terms of a CuO basis.

Nonmagnetic Material Preparation Step

First, a borosilicate glass powder containing Si, B, an alkali metal, and Al in predetermined proportions is prepared.

Preferably, the borosilicate glass material contains, in a total of 100% by weight, 70% by weight or more and 85% by weight or less (i.e., from 70% by weight to 85% by weight) Si in terms of a $SiO_2$ basis, 10% by weight or more and 25% by weight or less (i.e., from 10% by weight to 25% by weight) B in terms of a B2O3 basis, 0.5% by weight or more and 5% by weight or less (i.e., from 0.5% by weight to 5% by weight) alkali metal A on an $A_2O$ basis, and 0% by weight or more and 5% by weight or less (i.e., from 0% by weight to 5% by weight) Al on an $Al_2O_3$ basis.

Then, as filler, a forsterite powder and a quartz powder are prepared.

Then the borosilicate glass, forsterite, and quartz powders are wet-mixed in predetermined proportions and then ground to give a nonmagnetic material.

Green Sheet Preparation Step

First, predetermined proportions of the magnetic and nonmagnetic materials are weighed out. Then these measured materials, an organic binder, such as a polyvinyl butyral resin, organic solvents, such as ethanol and toluene, a plasticizer, etc., are mixed together and then ground to give slurry. Then the resulting slurry is shaped, for example by doctor blading, into sheets having a predetermined thickness, and then a predetermined shape is punched out of them to give green sheets.

In preparing the green sheets, the proportions of blending of the magnetic and nonmagnetic materials are adjusted so that type 1 green sheets, in which the percentage by volume of the magnetic material to the total volume of the magnetic and nonmagnetic materials is 60% by volume or more, and type 2 green sheets, in which the percentage by volume of the magnetic material to the total volume of the magnetic and nonmagnetic materials is 50% by volume or less, will result.

When what is stated applies to both type 1 and type 2 green sheets hereinafter, the simple term "green sheet" is used.

Conductor Pattern Formation Step

First, a predetermined point of the green sheet is irradiated with a laser to create a via hole.

Then an electrically conductive paste, such as Ag paste, is coated onto the surface of the green sheet and put into the via hole at the same time, for example by screen printing. Through this, a conductor pattern for via conductors is formed in the via hole in the green sheet, and a conductor pattern for coil conductors, coupled to the conductor pattern for via conductors, is formed on the surface of the green sheet at the same time. In such a way, a coil sheet is prepared as a green sheet with a conductor pattern for coil conductors formed thereon and a conductor pattern for via conductors formed therein. Multiple ones of these coil sheets are prepared, with each coil sheet having a conductor pattern for coil conductors corresponding to a coil conductor illustrated in FIGS. 8 and 9 formed thereon and a conductor pattern for via conductors corresponding to a via conductor illustrated in FIGS. 8 and 9 formed therein.

Separately from the coil sheets, a via sheet is prepared as a green sheet with a conductor pattern for via conductors formed therein by putting an electrically conductive paste, such as Ag paste, into the via hole, for example by screen printing. Multiple ones of these via sheets, too, are prepared, with each via sheet having a conductor pattern for via conductors corresponding to a via conductor illustrated in FIGS. 8 and 9 formed therein.

In preparing the coil sheets and via sheets, those that will be placed in the region the manufacturer wants to be the first region in the first and second body sections of the finished bodies are made using type 1 green sheets, and those that will be placed in the region the manufacturer wants to be the second region are made using type 2 green sheets.

Multilayer Block Preparation Step

The coil sheets and via sheets are stacked in the direction of stacking in an order corresponding to FIGS. 8 and 9 and then joined together by heat and pressure bonding to give a multilayer block. This makes the multilayer block have type 1 green sheets in the region the manufacturer wants to be the first region in the first and second body sections of the finished bodies and type 2 green sheets in the region the manufacturer wants to be the second region.

Body and Coil Production Step

First, the multilayer block is cut, for example with a dicer, into a predetermined size to give singulated chips.

Then the singulated chips are fired. The firing temperature is, for example, 900° C. or above and 920° C. or below (i.e., from 900° C. to 920° C.). The duration of firing, is, for example, 2 hours or more and 4 hours or less (i.e., from 2 hours to 4 hours).

Firing the singulated chips will turn the green sheets, which are coil sheets and via sheets, into insulating layers, thereby giving bodies that are formed by multiple insulating layers stacked in a direction of stacking, in the length direction here.

As mentioned above, in preparing the multilayer block, type 1 green sheets are placed in the region the manufacturer wants to be the first region in the first and second body sections of the finished bodies, and type 2 green sheets are placed in the region the manufacturer wants to be the second region. In the first and second body sections of the bodies produced in this step, therefore, the percentage by volume of the nonmagnetic phase to the total volume of the magnetic phase and nonmagnetic phase in the first region is 60% by volume or more. In the second region, furthermore, the percentage by volume of the nonmagnetic phase to the total volume of the magnetic phase and nonmagnetic phase is 50% by volume or less.

Firing the singulated chips will turn the conductor pattern for coil conductors on and the conductor pattern for via conductors in the coil sheets into a coil conductor and a via conductor, respectively, thereby giving coils that are formed by multiple coil conductors stacked in the length direction and electrically coupled together by via conductors.

In this way, bodies and coils disposed inside the bodies are produced. The direction of stacking of the insulating layers and the direction of the coil axis of the coil are parallel with the first main surface, which is the mounting surface, of the body, parallel with the length direction here.

Firing the singulated chips will turn the conductor pattern for via conductors in the via sheets into via conductors, thereby producing first and second interlinking conductors that are formed by multiple via conductors stacked in the length direction and electrically coupled together. The first interlinking conductor will become exposed on the first end surface of the body. The second interlinking conductor will become exposed on the second end surface of the body.

The corners and edges of the bodies may be rounded, for example by barrel polishing.

Outer Electrode Formation Step

First, an electrically conductive paste containing Ag and glass frit is stretched to a predetermined thickness, and the bodies are dipped diagonally into the resulting layer. Then the resulting coating is baked to form an underlying electrode that extends from part of the first end surface of the body to part of each of the first main surface, first lateral surface, and second lateral surface. Likewise, an underlying electrode is formed that extends from part of the second end surface of the body to part of each of the first main surface, first lateral surface, and second lateral surface. The temperature for baking the coating is, for example, 800° C. or above and 820° C. or below (i.e., from 800° C. to 820° C.).

Then, for example by electrolytic plating, a Ni plating electrode and a Sn plating electrode are formed on each underlying electrode in sequence.

In such a way, a first outer electrode, electrically coupled to the coil by the first interlinking conductor, and a second outer electrode, electrically coupled to the coil by the second interlinking conductor, are formed.

Through this, multilayer coil components 1 are produced.

Examples

The following presents examples in which the multilayer coil component according to the present disclosure is disclosed more specifically. It should be noted that the present disclosure is not limited to these examples.

Multilayer coil component samples 1 to 5 were produced by the following method.

Magnetic Material Preparation Step

First, proportions of $Fe_2O_3$, NiO, ZnO, and CuO were weighed out so that $Fe_2O_3$ would constitute 48.0 mol %, NiO 14.0 mol %, ZnO 30.0 mol %, and CuO 8.0 mol %. Then these measured materials were mixed in a ball mill with purified water and a PSZ (partially stabilized zirconia) medium for 6 hours and then ground to give slurry. Then the resulting slurry was dried and then calcined at 800° C. for 2 hours. In such a way, a powdery magnetic material, more specifically a powdery ferrite material, was prepared.

Nonmagnetic Material Preparation Step

First, a borosilicate glass powder containing Si, B, an alkali metal, and Al in predetermined proportions was prepared. Then, as filler, a forsterite powder and a quartz powder were prepared. Then the borosilicate glass powder, forsterite powder, and quartz powder are wet-mixed in such proportions that the glass powder would constitute 72% by weight, forsterite 4% by weight, and quartz 24% by weight, and then ground to give a nonmagnetic material.

Separately, body samples were prepared by the following method for checking the composition of the body of finished multilayer coil component samples 1 to 5 with. First, amounts of the magnetic and nonmagnetic materials were weighed out so that the magnetic material would constitute 100% by volume, and the nonmagnetic material 0% by volume. Then these measured materials, a polyvinyl butyral resin as an organic binder, ethanol and toluene as organic solvents, and a plasticizer were mixed together in a ball mill with a PSZ medium and then ground to give slurry. Then the resulting slurry was shaped into sheets by doctor blading, and these sheets were stacked and joined together by heat and pressure bonding to give a green block. A portion was punched out of the green block and fired at 910° C. for 4 hours, giving disk-shaped body sample A having a thickness of 0.5 mm and a diameter of 10 mm.

Then body samples B, C, and D were prepared in the same way as body sample A, except that the magnetic and nonmagnetic materials were blended in the proportions specified in Table 1.

Body samples A, B, C, and D were analyzed by inductively coupled plasma atomic emission spectroscopy/mass spectrometry, confirming that they had the compositions presented in Table 1.

TABLE 1

| | | Body Samples | | | |
|---|---|---|---|---|---|
| | | A | B | C | D |
| Percentage by volume (% by volume) | Magnetic material | 100 | 50 | 40 | 0 |
| | Nonmagnetic material | 0 | 50 | 60 | 100 |
| Composition (% by weight) | $K_2O$ | — | 0.4 | 0.5 | 1.2 |
| | $B_2O_3$ | — | 3.8 | 4.9 | 12.9 |
| | $SiO_2$ | — | 23.9 | 31.4 | 82.3 |
| | $Al_2O_3$ | — | 0.1 | 0.1 | 0.2 |
| | MgO | — | 1.0 | 1.3 | 3.4 |
| | $Fe_2O_3$ | 66.1 | 46.8 | 40.8 | — |
| | NiO | 18.8 | 13.3 | 11.6 | — |
| | ZnO | 9.7 | 6.9 | 6.0 | — |
| | CuO | 5.4 | 3.8 | 3.4 | — |

Green Sheet Preparation Step

Green sheets A as building units for a green block as described above were prepared using materials having the same composition as body sample A. That is, in the finished bodies, a region formed by green sheets A would have the same composition as body sample A.

Likewise, green sheets B were prepared using materials having the same composition as body sample B, green sheets C were prepared using materials having the same composition as body sample C, and green sheets D were prepared using materials having the same composition as body sample D. In the finished bodies, a region formed by green sheets B would have the same composition as body sample B, a region formed by green sheets C would have the same composition as body sample C, and a region formed by green sheets D would have the same composition as body sample D.

Green sheets C and D are categorized into type 1 green sheets, in which the percentage by volume of the nonmagnetic material to the total volume of the magnetic and nonmagnetic materials is 60% by volume or more. Green sheets A and B are categorized into type 2 green sheets, in which the percentage by volume of the nonmagnetic material to the total volume of the magnetic and nonmagnetic materials is 50% by volume or less.

Conductor Pattern Formation Step

First, a predetermined point of the green sheet was irradiated with a laser to create a via hole.

Then Ag paste was coated onto the surface of the green sheet and put into the via hole at the same time by screen printing. Through this, a conductor pattern for via conductors was formed in the via hole in the green sheet, and a conductor pattern for coil conductors, coupled to the conductor pattern for via conductors, was formed on the surface of the green sheet at the same time. In such a way, a coil sheet was prepared as a green sheet with a conductor pattern for coil conductors formed thereon and a conductor pattern for via conductors formed therein. Multiple ones of these coil sheets were prepared, with each coil sheet given a conductor pattern for coil conductors corresponding to a coil conductor illustrated in FIGS. 8 and 9 formed thereon and a conductor pattern for via conductors corresponding to a via conductor illustrated in FIGS. 8 and 9 formed therein.

Separately from the coil sheets, a via sheet was prepared as a green sheet with a conductor pattern for via conductors formed therein by putting Ag paste into the via hole by screen printing. Multiple ones of these via sheets, too, were prepared, with each via sheet given a conductor pattern for via conductors corresponding to a via conductor illustrated in FIGS. 8 and 9 formed therein.

Multilayer Block Preparation Step

The coil sheets and via sheets were stacked in the direction of stacking in an order corresponding to FIGS. 8 and 9 and then joined together by heat and pressure bonding to give a multilayer block.

Body and Coil Production Step

First, the multilayer block was cut with a dicer into a predetermined size to give singulated chips.

Then the singulated chips were fired at 910° C. for 4 hours.

Firing the singulated chips turned the green sheets, which were coil sheets and via sheets, into insulating layers, thereby giving bodies that were formed by multiple insulating layers stacked in a direction of stacking, in the length direction here.

Firing the singulated chips turned the conductor pattern for coil conductors on and the conductor pattern for via conductors in the coil sheets into a coil conductor and a via conductor, respectively, thereby giving coils that were formed by multiple coil conductors stacked in the length direction and electrically coupled together by via conductors.

In this way, bodies and coils disposed inside the bodies were produced. The direction of stacking of the insulating layers and the direction of the coil axis of the coil were parallel with the first main surface, which was the mounting surface, of the body, parallel with the length direction here.

Firing the singulated chips turned the conductor pattern for via conductors in the via sheets into via conductors, thereby producing first and second interlinking conductors that were formed by multiple via conductors stacked in the length direction and electrically coupled together. The first interlinking conductor became exposed on the first end surface of the body. The second interlinking conductor became exposed on the second end surface of the body.

Then the corners and edges of the bodies were rounded by barrel-polishing with a medium in a rotary barrel.

Outer Electrode Formation Step

First, an electrically conductive paste containing Ag and glass frit was stretched to a predetermined thickness, and the bodies were dipped diagonally into the resulting layer. Then the resulting coating was baked at 810° C. to form an underlying electrode that extended from part of the first end surface of the body to part of each of the first main surface, first lateral surface, and second lateral surface. Likewise, an underlying electrode was formed that extended from part of the second end surface of the body to part of each of the first main surface, first lateral surface, and second lateral surface. The thickness of each underlying electrode was 5 μm.

Then, by electrolytic plating, a Ni plating electrode and a Sn plating electrode were formed on each underlying electrode in sequence.

In such a way, a first outer electrode, electrically coupled to the coil by the first interlinking conductor, and a second outer electrode, electrically coupled to the coil by the second interlinking conductor, were formed.

Through this, multilayer coil component samples 1 to 5 were produced. Multilayer coil component samples 1 to 5 each had a dimension in the length direction of 0.6 mm, a dimension in the height direction of 0.3 mm, and a dimension in the width direction of 0.3 mm.

For multilayer coil component samples 1 to 5, when a first reference position is defined that coincides in the height direction with the end in the length direction of the portion of the underlying electrode in the first outer electrode lying on the first main surface of the body, the first region in the first body section of the body was a combined range consisting of the range having a dimension in the length direction of 20 μm from the first reference position toward the second end surface (dimension $P_1$ in FIG. 11) and the range having a dimension in the length direction of 20 μm from the first reference position toward the first end surface (dimension $P_2$ in FIG. 11). For multilayer coil component samples 1 to 5, furthermore, the second region in the first body section was all but the first region.

For multilayer coil component samples 1 to 5, when a second reference position is defined that coincides in the height direction with the end in the length direction of the portion of the underlying electrode in the second outer electrode lying on the first main surface of the body, the first region in the second body section of the body was a combined range consisting of the range having a dimension in the length direction of 20 μm from the second reference position toward the first end surface (dimension $Q_1$ in FIG. 12) and the range having a dimension in the length direction of 20 μm from the second reference position toward the second end surface (dimension $Q_2$ in FIG. 12). For multilayer coil component samples 1 to 5, furthermore, the second region in the second body section was all but the first region.

For multilayer coil component samples 1 to 5, the green sheets forming the first and second regions in the first and second body sections were combined as specified in Table 2. As a result, for multilayer coil component samples 1 to 5, the percentage by volume of the nonmagnetic phase to the total volume of the magnetic phase and nonmagnetic phase in the first region and the percentage by volume of the nonmagnetic phase to the total volume of the magnetic phase and nonmagnetic phase in the second region in the first and second body sections were as presented in Table 2. For multilayer coil component samples 1 to 5, furthermore, the Si content in terms of a $SiO_2$ basis of the first region and the Si content in terms of a $SiO_2$ basis of the second region in the first and second body sections were as presented in Table 2 (labeled as "$SiO_2$ content" in Table 2).

Testing

Multilayer coil component samples 1 to 5 were tested as follows.

Position of the Substrate and Plating Electrodes

First, the multilayer coil component sample was sealed by filling its surroundings with resin, upright in such a manner that the first lateral surface was exposed upside. Then the multilayer coil component sample was polished using a grinder to substantially the middle in the width direction to expose a cross-section parallel with the length and height directions. After that, the exposed cross-section of the multilayer coil component sample underwent focused ion beam (FIB) milling using SII NanoTechnology's "SMI3050R" focused ion beam mill, giving a cross-section for observation. Then on the cross-section for observation of the multilayer coil component sample, the portion of the substrate and plating electrodes in the first outer electrode lying on the first main surface of the body was imaged using a scanning electron microscope (SEM). Likewise, the portion of the substrate and plating electrodes in the second outer electrode lying on the first main surface of the body was imaged. After that, the position of the substrate and plating electrodes was checked on the resulting images, with the result that in the length direction, the end of the plating electrode was closer than the end of the underlying electrode to the midpoint of the body. The distance in the length direction between the end of the plating electrode and the end of the underlying electrode, furthermore, was as presented in Table 2.

TABLE 2

| | | *Sample 1 | *Sample 2 | Sample 3 | Sample 4 | Sample 5 |
|---|---|---|---|---|---|---|
| First region | Green sheets | A | B | C | C | D |
| | Nonmagnetic phase (% by volume) | 0 | 50 | 60 | 60 | 100 |
| | $SiO_2$ content (% by weight) | — | 23.9 | 31.4 | 31.4 | 82.3 |
| Second region | Green sheets | A | A | A | B | B |
| | Nonmagnetic phase (% by volume) | 0 | 0 | 0 | 50 | 50 |
| | $SiO_2$ content (% by weight) | — | — | — | 23.9 | 23.9 |
| Difference in $SiO_2$ content between the first and second regions (% by weight) | | — | 23.9 | 31.4 | 7.5 | 58.4 |
| Distance in the length direction between the end of the plating electrode and the end of the underlying electrode (μm) | | 40 | 50 | 22 | 20 | 15 |

In Table 2, the samples having a name with an * are comparative examples, examples falling out of the scope of the present disclosure.

As shown in Table 2, for multilayer coil component samples 3, 4, and 5, the percentage by volume of the nonmagnetic phase to the total volume of the magnetic phase and nonmagnetic phase in the first region was 60% by volume or more, and the percentage by volume of the nonmagnetic phase to the total volume of the magnetic phase and nonmagnetic phase in the second region was 50% by volume or less.

For multilayer coil component samples 1 and 2, on the other hand, the percentage by volume of the nonmagnetic phase to the total volume of the magnetic phase and nonmagnetic phase in the second region was 50% by volume or less, but in the first region, the percentage by volume of the nonmagnetic phase to the total volume of the magnetic phase and nonmagnetic phase was smaller than 60% by volume.

For multilayer coil component samples 3, 4, and 5, compared with multilayer coil component samples 1 and 2, the distance in the length direction between the end of the plating electrode and the end of the underlying electrode was small. In other words, the plating electrode was prevented from outgrowing the underlying electrode along the first main surface of the body.

Transmission Coefficient S21

With multilayer coil component samples 1, 3, and 4, the transmission coefficient S21, determined from the ratio of the power of the transmitted signal to that of the incident signal, was measured at varying frequencies from 30 GHz to 70 GHz using a network analyzer.

Figure 13:
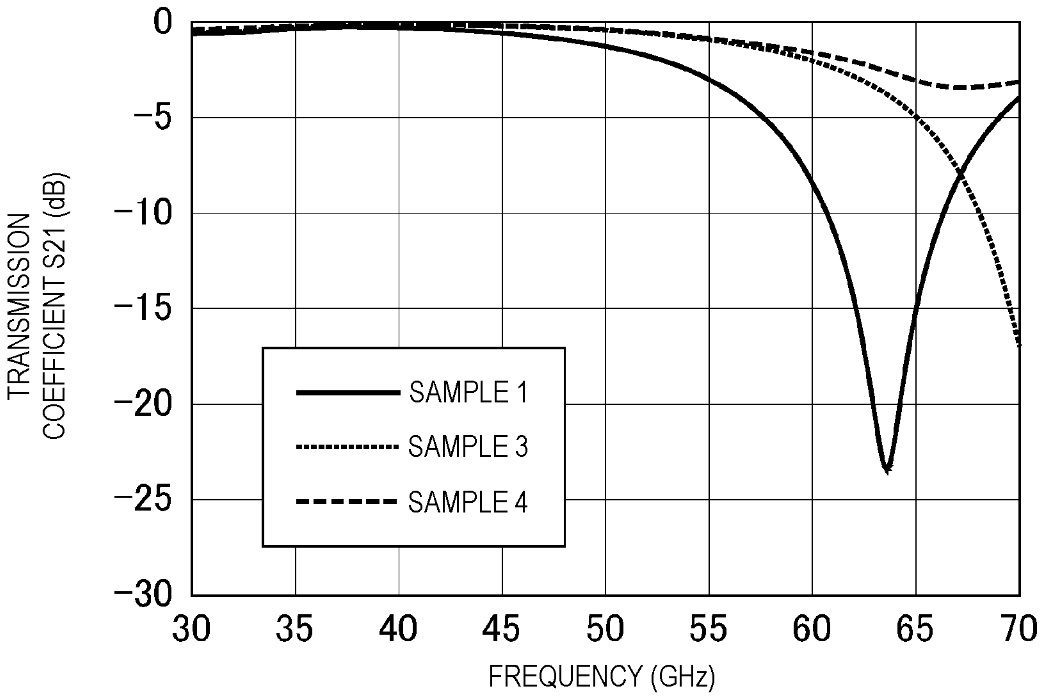
FIG. 13 is a graphical representation of measured transmission coefficients S21 of multilayer coil component samples 1, 3, and 4.

FIG. 13 is a graphical representation of measured transmission coefficients S21 of multilayer coil component samples 1, 3, and 4.

As shown in FIG. 13, multilayer coil component samples 3 and 4, compared with multilayer coil component sample 1, had a high transmission coefficient S21 in the radiofrequency band, for example at 40 GHz and 50 GHz, and were consistent in the transmission coefficient S21 in the radiofrequency and lower-frequency bands. Although not shown, multilayer coil component sample 5 was also found to have a high and consistent transmission coefficient S21 in the radiofrequency band like multilayer coil component samples 3 and 4.

What is claimed is:

1. A multilayer coil component comprising:

a body including a plurality of insulating layers stacked in a direction of stacking and having first and second end surfaces opposite each other in a length direction, first and second main surfaces opposite each other in a height direction, perpendicular to the length direction, and first and second lateral surfaces opposite each other in a width direction, perpendicular to the length direction and to the height direction;

a coil provided in the body and configured by a plurality of coil conductors electrically connected; and a first outer electrode extending from at least a portion of the first end surface of the body to a portion of the first main surface and electrically connected to the coil, wherein the direction of stacking of the insulating layers and a direction of a coil axis of the coil are parallel with the first main surface, which is a mounting surface, of the body;

the first outer electrode includes, in order from a body side, an underlying electrode and a plating electrode on the underlying electrode;

when a boundary is defined that extends parallel with the height and width directions at a midpoint of the body in the length direction, the body has first and second body sections arranged in the length direction with the boundary therebetween, the first body section including the first end surface and the second body section including the second end surface;

when a first reference position is defined that coincides in the height direction with an end of the underlying electrode in the length direction of a portion of the underlying electrode lying on the first main surface of the body, the first body section has first and second regions, the first region including at least a range having a dimension of 20 μm in the length direction from the first reference position toward the second end surface and a second region other than the first region;

in the first region, a percentage by volume of a nonmagnetic phase to a total volume of magnetic phase and nonmagnetic phase is 60% by volume or more; and in the second region, a percentage by volume of a nonmagnetic phase to a total volume of magnetic phase and nonmagnetic phase is 50% by volume or less.

2. The multilayer coil component according to claim 1, wherein an end of the first region on a second end surface side is at a point where a distance in the length direction from the first reference position is from 20 μm to 60 μm.

3. The multilayer coil component according to claim 1, wherein the first region further includes at least a range having a dimension of 20 μm in the length direction from first reference position toward the first end surface.

4. The multilayer coil component according to claim 3, wherein an end of the first region on a first end surface side is at a point where a distance in the length direction from the first reference position is from 20 μm to 60 μm.

5. The multilayer coil component according to claim 1, wherein the first region contains, in a total of 100% by weight, Si being from 30.0% by weight to 85.0% by weight in terms of a $SiO_2$ basis, B being from 4.0% by weight to 15.0% by weight in terms of a $B_2O_3$ basis, Fe being from 0% by weight to 45.0% by weight in terms of an $Fe_2O_3$ basis, Ni being from 0% by weight to 15.0% by weight in terms of a NiO basis, Zn being from 0% by weight to 8.0% by weight in terms of a ZnO basis, and Cu being from 0% by weight to 5.0% by weight in terms of a CuO basis.

6. The multilayer coil component according to claim 5, wherein the first region further contains, in a total of 100% by weight, K being from 0.3% by weight to 1.5% by weight in terms of a $K_2O$ basis, and Mg being from 0.9% by weight to 3.5% by weight in terms of a MgO basis.

7. The multilayer coil component according to claim 1, wherein the second region contains, in a total of 100% by weight, Si being from 0% by weight to 25.0% by weight in terms of a $SiO_2$ basis, B being from 0% by weight to 5.0% by weight in terms of a $B_2O_3$ basis, Fe being from 45.0% by weight to 70.0% by weight in terms of an $Fe_2O_3$ basis, Ni being from 10.0% by weight to 20.0% by weight in terms of a NiO basis, and Zn being from 5.0% by weight to 12.0% by weight in terms of a ZnO basis.

8. The multilayer coil component according to claim 1, wherein a Si content of the first region in a total of 100% by weight is larger than a Si content of the second region in a total of 100% by weight by 7.0% by weight or more in terms of a $SiO_2$ basis.

9. The multilayer coil component according to claim 2, wherein the first region further includes at least a range having a dimension of 20 μm in the length direction from first reference position toward the first end surface.

10. The multilayer coil component according to claim 2, wherein the first region contains, in a total of 100% by weight, Si being from 30.0% by weight to 85.0% by weight in terms of a $SiO_2$ basis, B being from 4.0% by weight to 15.0% by weight in terms of a $B_2O_3$ basis, Fe being from 0% by weight to 45.0% by weight in terms of an $Fe_2O_3$ basis, Ni being from 0% by weight to 15.0% by weight in terms of a NiO basis, Zn being from 0% by weight to 8.0% by weight in terms of a ZnO basis, and Cu being from 0% by weight to 5.0% by weight in terms of a CuO basis.

11. The multilayer coil component according to claim 3, wherein the first region contains, in a total of 100% by weight, Si being from 30.0% by weight to 85.0% by weight in terms of a $SiO_2$ basis, B being from 4.0% by weight to 15.0% by weight in terms of a $B_2O_3$ basis, Fe being from 0% by weight to 45.0% by weight in terms of an $Fe_2O_3$ basis, Ni being from 0% by weight to 15.0% by weight in terms of a NiO basis, Zn being from 0% by weight to 8.0% by weight in terms of a ZnO basis, and Cu being from 0% by weight to 5.0% by weight in terms of a CuO basis.

12. The multilayer coil component according to claim 4, wherein the first region contains, in a total of 100% by weight, Si being from 30.0% by weight to 85.0% by weight in terms of a $SiO_2$ basis, B being from 4.0% by weight to 15.0% by weight in terms of a $B_2O_3$ basis, Fe being from 0% by weight to 45.0% by weight in terms of an $Fe_2O_3$ basis, Ni being from 0% by weight to 15.0% by weight in terms of a NiO basis, Zn being from 0% by weight to 8.0% by weight in terms of a ZnO basis, and Cu being from 0% by weight to 5.0% by weight in terms of a CuO basis.

13. The multilayer coil component according to claim 2, wherein the second region contains, in a total of 100% by weight, Si being from 0% by weight to 25.0% by weight in terms of a $SiO_2$ basis, B being from 0% by weight to 5.0% by weight in terms of a $B_2O_3$ basis, Fe being from 45.0% by weight to 70.0% by weight in terms of an $Fe_2O_3$ basis, Ni being from 10.0% by weight to 20.0% by weight in terms of a NiO basis, and Zn being from 5.0% by weight to 12.0% by weight in terms of a ZnO basis.

14. The multilayer coil component according to claim 3, wherein the second region contains, in a total of 100% by weight, Si being from 0% by weight to 25.0% by weight in terms of a $SiO_2$ basis, B being from 0% by weight to 5.0% by weight in terms of a $B_2O_3$ basis, Fe being from 45.0% by weight to 70.0% by weight in terms of an $Fe_2O_3$ basis, Ni being from 10.0% by weight to 20.0% by weight in terms of a NiO basis, and Zn being from 5.0% by weight to 12.0% by weight in terms of a ZnO basis.

15. The multilayer coil component according to claim 4, wherein the second region contains, in a total of 100% by weight, Si being from 0% by weight to 25.0% by weight in terms of a $SiO_2$ basis, B being from 0% by weight to 5.0% by weight in terms of a $B_2O_3$ basis, Fe being from 45.0% by weight to 70.0% by weight in terms of an $Fe_2O_3$ basis, Ni being from 10.0% by weight to 20.0% by weight in terms of a NiO basis, and Zn being from 5.0% by weight to 12.0% by weight in terms of a ZnO basis.

16. The multilayer coil component according to claim 5, wherein the second region contains, in a total of 100% by weight, Si being from 0% by weight to 25.0% by weight in terms of a $SiO_2$ basis, B being from 0% by weight to 5.0% by weight in terms of a $B_2O_3$ basis, Fe being from 45.0% by weight to 70.0% by weight in terms of an $Fe_2O_3$ basis, Ni being from 10.0% by weight to 20.0% by weight in terms of a NiO basis, and Zn being from 5.0% by weight to 12.0% by weight in terms of a ZnO basis.

17. The multilayer coil component according to claim 2, wherein a Si content of the first region in a total of 100% by weight is larger than a Si content of the second region in a total of 100% by weight by 7.0% by weight or more in terms of a $SiO_2$ basis.

18. The multilayer coil component according to claim 3, wherein a Si content of the first region in a total of 100% by weight is larger than a Si content of the second region in a total of 100% by weight by 7.0% by weight or more in terms of a $SiO_2$ basis.

19. The multilayer coil component according to claim 4, wherein a Si content of the first region in a total of 100% by weight is larger than a Si content of the second region in a total of 100% by weight by 7.0% by weight or more in terms of a $SiO_2$ basis.

20. A multilayer coil component comprising:

a body including a plurality of insulating layers stacked in a direction of stacking and having first and second end surfaces opposite each other in a length direction, first and second main surfaces opposite each other in a height direction, perpendicular to the length direction, and first and second lateral surfaces opposite each other in a width direction, perpendicular to the length direction and to the height direction;

a coil provided in the body and configured by a plurality of coil conductors electrically connected; and a first outer electrode extending from at least a portion of the first end surface of the body to a portion of the first main surface and electrically connected to the coil, wherein the direction of stacking of the insulating layers and a direction of a coil axis of the coil are parallel with the first main surface, which is a mounting surface, of the body;

the first outer electrode includes, in order from a body side, an underlying electrode and a plating electrode on the underlying electrode;

when a boundary is defined that extends parallel with the height and width directions at a midpoint of the body in the length direction, the body has first and second body sections arranged in the length direction with the boundary therebetween, the first body section including the first end surface and the second body section including the second end surface;

when a first reference position is defined that coincides in the height direction with an end of the underlying electrode in the length direction of a portion of the underlying electrode lying on the first main surface of the body, the first body section has first and second regions, the first region including at least a range having a dimension of 20 μm in the length direction from the first reference position toward the second end surface and a second region other than the first region;

the first region contains, in a total of 100% by weight,

Si being from 30.0% by weight to 85.0% by weight in terms of a $SiO_2$ basis,

B being from 4.0% by weight to 15.0% by weight in terms of a $B_2O_3$ basis,

Fe being from 0% by weight to 45.0% by weight in terms of an $Fe_2O_3$ basis,

Ni being from 0% by weight to 15.0% by weight in terms of a NiO basis,

Zn being from 0% by weight to 8.0% by weight in terms of a ZnO basis, and

Cu being from 0% by weight to 5.0% by weight in terms of a CuO basis; and the second region contains, in a total of 100% by weight, Si being from 0% by weight to 25.0% by weight in terms of a $SiO_2$ basis, B being from 0% by weight to 5.0% by weight in terms of a $B_2O_3$ basis, Fe being from 45.0% by weight to 70.0% by weight in terms of an $Fe_2O_3$ basis, Ni being from 10.0% by weight to 20.0% by weight in terms of a NiO basis, and Zn being from 5.0% by weight to 12.0% by weight in terms of a ZnO basis.

* * * * *